United States Patent
Scott et al.

(10) Patent No.: US 9,614,941 B2
(45) Date of Patent: Apr. 4, 2017

(54) ELECTRONIC DEVICE INCLUDING OPENABLE COVER

(71) Applicant: Samsung Electronics Co., Ltd., Gyeonggi-do (KR)

(72) Inventors: Dana Scott, Hawley, PA (US); Seung-Taek Oh, Seoul (KR); Byung-Chul Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 14/565,214

(22) Filed: Dec. 9, 2014

(65) Prior Publication Data
US 2015/0163940 A1 Jun. 11, 2015

(30) Foreign Application Priority Data
Dec. 9, 2013 (KR) .................. 10-2013-0152366

(51) Int. Cl.
*G06F 1/16* (2006.01)
*H04M 1/02* (2006.01)

(52) U.S. Cl.
CPC ........ *H04M 1/0249* (2013.01); *G06F 1/1626* (2013.01); *G06F 1/1656* (2013.01); *H04M 1/0216* (2013.01); *H04M 1/0227* (2013.01)

(58) Field of Classification Search
CPC ... G06F 1/1626; G06F 1/1656; H04M 1/0216
See application file for complete search history.

(56) References Cited

U.S. PATENT DOCUMENTS

| | | | | |
|---|---|---|---|---|
| 7,856,180 B2* | 12/2010 | Chishima | ............... | G03B 17/04 348/36 |
| 8,594,753 B2* | 11/2013 | Makino | ............... | H04M 1/0216 361/679.06 |
| 8,787,016 B2* | 7/2014 | Rothkopf | ............ | H04M 1/0216 361/679.02 |
| 9,047,048 B2* | 6/2015 | Ge | ......................... | G06F 1/1616 |
| 2003/0040346 A1* | 2/2003 | Fukuda | ................. | G06F 1/1616 455/575.1 |
| 2004/0229668 A1 | 11/2004 | Lin | | |
| 2006/0019726 A1* | 1/2006 | Park | ..................... | H04M 1/0227 455/575.1 |
| 2006/0098813 A1* | 5/2006 | Takamori | ............... | G06F 1/1622 379/433.13 |
| 2006/0146013 A1* | 7/2006 | Arneson | ................ | G06F 1/1622 345/156 |
| 2007/0065090 A1* | 3/2007 | Lin | ..................... | H04M 1/0227 385/147 |
| 2007/0227873 A1* | 10/2007 | Kawasaki | ............. | G06F 1/1613 200/443 |
| 2009/0226245 A1* | 9/2009 | Takamori | ............... | F16M 11/06 403/220 |
| 2009/0305753 A1* | 12/2009 | Zhang | ................... | G06F 1/1622 455/575.1 |
| 2010/0016036 A1* | 1/2010 | Urushihara | ......... | H04M 1/0247 455/575.1 |

(Continued)

*Primary Examiner* — Courtney Smith
*Assistant Examiner* — Keith Depew

(57) ABSTRACT

An electronic device is provided. The electronic device includes a housing of the electronic device, a glass cover installed in at least a portion of the housing, and an opening and closing unit installed to open or close the glass cover from the housing.

20 Claims, 15 Drawing Sheets

(56) References Cited

U.S. PATENT DOCUMENTS

| | | | |
|---|---|---|---|
| 2010/0225577 A1* | 9/2010 | Christensen | H04M 1/0247 345/156 |
| 2010/0331059 A1* | 12/2010 | Apgar | H04M 1/0227 455/575.1 |
| 2011/0182004 A1* | 7/2011 | Shen | H04M 1/0227 361/679.01 |
| 2011/0188180 A1 | 8/2011 | Pakula et al. | |
| 2012/0049710 A1* | 3/2012 | Yang | H04M 1/0227 312/326 |
| 2012/0188688 A1* | 7/2012 | Holman, IV | H04M 1/0227 361/679.01 |
| 2012/0224300 A1* | 9/2012 | Holman, IV | H04M 1/0227 361/679.01 |
| 2012/0238334 A1* | 9/2012 | Murayama | H04M 1/0237 455/575.4 |
| 2012/0249428 A1* | 10/2012 | Holman, IV | G06F 1/1622 345/173 |
| 2012/0250283 A1* | 10/2012 | Travis | G06F 1/1622 361/807 |
| 2012/0275100 A1 | 11/2012 | Pakula et al. | |
| 2012/0281380 A1* | 11/2012 | Werner | G06F 1/1626 361/807 |
| 2012/0295666 A1* | 11/2012 | Sakurai | H01Q 1/243 455/566 |
| 2012/0300373 A1* | 11/2012 | Holman, IV | G06F 1/1622 361/679.01 |
| 2013/0044414 A1* | 2/2013 | Peng | H04M 1/0227 361/679.01 |
| 2014/0055930 A1* | 2/2014 | Kuan | H05K 5/0221 361/679.01 |
| 2015/0015777 A1* | 1/2015 | Osborne | H04N 5/2252 348/373 |
| 2015/0086048 A1* | 3/2015 | Brown | H04R 1/02 381/152 |
| 2015/0151515 A1* | 6/2015 | Skepton | A45C 11/00 428/43 |

\* cited by examiner

ELECTRONIC DEVICE INCLUDING OPENABLE COVER

PRIORITY

The present application is related to and claims the benefit under 35 U.S.C. §119 (a) of a Korean Intellectual Property Office on Dec. 9, 2013 and assigned Serial No. 10-2013-0152366, the entire disclosure which is hereby incorporated by reference.

TECHNICAL FIELD

The present disclosure relates generally to an electronic device including an openable cover.

BACKGROUND

Currently, due to development of electronic communication industry, user devices (for example, electronic devices, such as a cellular phone, an electronic organizer, a personal complex terminal, a lap top computer or the like) have become necessity in the modern society, and thus become important information transfer means that is rapidly changing. Such a user device comes to make user's work convenient through a graphical user interface (GUI) environment using a touch screen, and to provide a variety of multimedia based on a Web environment.

Also, the user devices are equipped with various electronic components so as to provide various functions. For example, the user devices are equipped with a stereo speaker module to provide a listening-to-music function using a stereo sound. In addition to, the user devices are equipped with a camera module to provide a photography function. Further, the user devices are equipped with a communication module to provide a communication function with other electronic devices.

Furthermore, a tendency to prefer luxurious appearance has been increasing, and in accordance with such a tendency, the competition for manufacturing the user devices luxuriously and attractively has been more intense.

SUMMARY

To address the above-discussed deficiencies, it is a primary object to provide an electronic device including an openable cover.

Another aspect of the present disclosure is to provide an electronic device including an easily openable cover.

In accordance with an aspect of the present disclosure, an electronic device includes a housing, a glass cover installed in at least a portion of the housing, and an opening/closing unit installed to open or close the glass cover from the housing.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
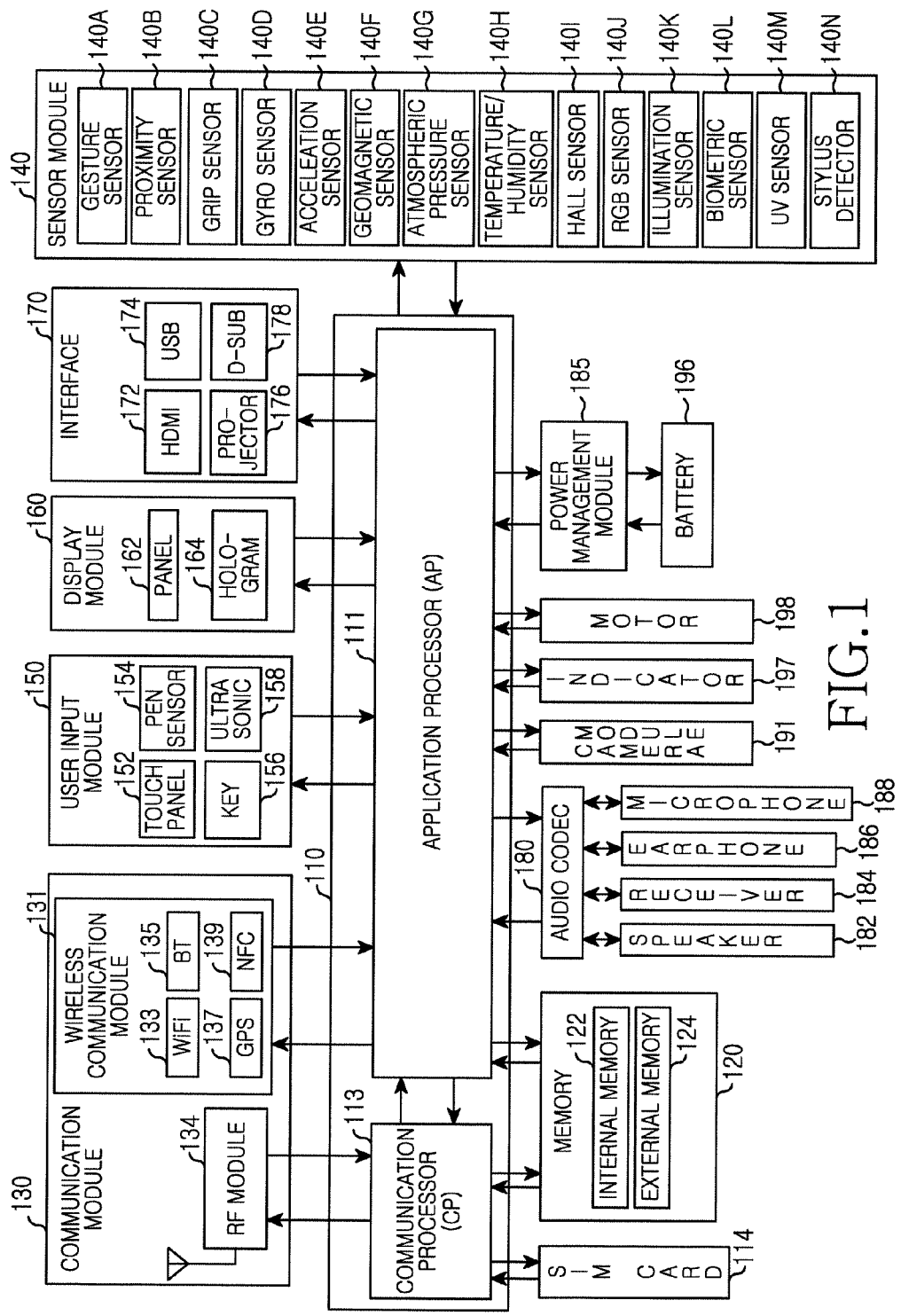
FIG. 1 is a block diagram of example hardware according to this disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The following description with reference to the accompanying drawings is provided to assist in a comprehensive understanding of embodiments of the disclosure as defined by the claims and their equivalents. It includes various specific details to assist in that understanding but these are to be regarded as merely examples. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to their dictionary meanings, but, are merely used to enable a clear and consistent understanding of the disclosure. Accordingly, it should be apparent to those skilled in the art that the following description of embodiments of the present disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to various embodiments of the present disclosure may be a device having a communication function. For example, the electronic device can include at least one of a smart phone, a tablet personal computer (PC), a video phone, an e-book reader, a desktop personal computer (desktop PC), a personal digital assistant (PDA), a portable multimedia player (PMP), a MP3 player, a mobile medical apparatus, a camera, or wearable devices (for example, a head-mounted-device (HMD), such as an electronic eyeglass, an electronic cloth, an electronic bracelet, an electronic necklace, an electronic appcessory, or a smart watch).

In accordance with any embodiments, the electronic device can be a smart home appliance equipped with a communication function. For example, the smart home appliance may include at least one of a television, a digital video disk player (DVD player), an audio, a refrigerator, an air conditioner, a cleaner, an oven, a microwave oven, a washing machine, an air purifier, a set-top box, a TV box (for example, Samsung HomeSync™, Apple TV™, or Google TV™), game consoles, an electronic dictionary, a camcorder, or a digital photo frame).

In accordance with any embodiments, the electronic device can include at least one of various medical apparatuses (for example, a magnetic resonance angiography (MRA), a magnetic resonance imaging (MRI), a computed tomography (CT), a camcorder, an ultrasonic instrument or the like), a navigation device, a global positioning system receiver (GPS receiver), an event data recorder (EDR), a flight data recorder (FDR), a vehicle infotainment device, marine electronic equipments (a navigation equipment for ship, a gyro compass and the like), avionics or a security equipment.

In accordance with any embodiments, the electronic device can include at least one of furniture, a part of buildings/structures, an electronic board, an electronic signature receiving device, a projector, or various measuring instruments (for example, measuring instruments for water, electricity, gas, radio wave or the like) having a communication function. The electronic device according to various embodiments may be one or more combinations of the aforementioned various devices. Also, it is well known to those skilled in this art that the electronic device according to various embodiments of the present disclosure is not limited to the aforementioned devices.

FIG. 1 is a block diagram of example hardware according to this disclosure.

Referring to FIG. 1, the hardware includes at least one processor 110, a subscriber identification module card (SIM card) 114, a memory 120, a communication module 130, a sensor module 140, a user input module 150, a display module 160, an interface 170, an audio codec 180, a camera module 191, a power management module 195, a battery 196, an indicator 197 or a motor 198.

The processor 110 includes at least one application processor (AP) 111 or at least one communication processor (CP) 113. Although the AP 111 and the CP 113 are included in the processor 110 in FIG. 1, the AP 111 and the CP 113 may be included in different IC packages from each other, respectively. The AP 111 and the CP 113 may also be included in one IC package.

The AP 11 operates an operating system or an application program to control a plurality of hardware or software components connected to the AP 111, and perform various processing and calculating of data including multimedia data. The AP 111 may be realized using, for example, a system on chip (SoC). The processor 110 further includes a graphic processing unit (GPU) that is not shown.

The CP 113 performs functions which manage data links and converts communication protocols in communications between other hardwares connected to the hardware device 100 by a network. The CP 113 is implemented using, for example the SoC. The CP 113 also performs at least a part of multimedia control function. The CP 113 performs identification and authentication of terminals in the communication network using a subscriber identity module (for example, the SIM card 114). The CP 113 provides a user with services, such as a voice call, a video call, a text message, packet data or the like.

The CP 113 controls data transmission and reception of the communication module 130. Although components, such as the CP 113, the power managing module 195, the memory or the like are shown as separated from the AP 111, the AP 111 is also realized so as to include at least a portion (for example, CP 113) of components described above.

The AP 111 or the CP 113 loads command or data into a volatile memory to process the command or data received from at least one of a non-volatile memory or other components which are connected thereto, respectively. The AP 111 or the CP 113 stores data in the non-volatile memory, in which the data is received from at least one of other components or is generated by at least one of other components.

The SIM card 114 is a card which realizes a subscriber identity module, and is inserted into a slot formed in a specific location of the hardware 100. The SIM card 114 includes unique identifying information (for example, an integrated circuit card identifier (ICCID)) or subscriber information (for example, an international mobile subscriber identity (IMSI)).

The memory includes an internal memory 122, or an external memory 124. The internal memory 122 includes at least one of for example, a volatile memory (for example, a dynamic RAM (DRAM), a static RAM: SRAM), a synchronous dynamic RAM (SDRAM) or the like) or a non-volatile memory (for example, an one time programmable ROM (OTPROM), a programmable ROM (PROM), an erasable and programmable ROM (EPROM), an electrically erasable and programmable ROM (EEPROM), a mask ROM, a flash ROM, a NAND flash memory, a NOR flash memory or the like). The internal memory 122 may also take a form of a solid state drive (SSD). The external memory 124 may further include, for example, a compact flash (CF), a secure digital (SD), a micro secure digital (Micro-SD), a mini secure digital (Mini-SD), an extreme digital (XD), a memorystick or the like.

The communication module 130 includes a wireless communication module 131 or a RF module 134. The wireless communication module 131 includes, for example, a Wi-Fi 133, a Bluetooth (BT) 135, a GPS 137 or a near field communication (NFC) 139. For example, the wireless communication module 131 may provide a wireless communication function using a radio frequency. For example, additionally or alternatively, the wireless communication module 131 includes a network interface (for example, a LAN card), a modem or the like for connecting the hardware 100 to networks (for example, an Internet, a local area network (LAN), a wire area network (WAN), a telecommunication network, a cellular network, a satellite network, a plain old telephone service (POTS) or the like).

The RF module plays a role in transmitting and receiving data, for example, a RF signal or a call electronic signal. Although not shown, the RF module 134 includes, for example, a transceiver, a power amp module (PAM), a frequency filter, a low noise amplifier (LNA) or the like. The RF module 134 further includes components, for example, a conductor, a conducting wire or the like for transmitting and receiving electromagnetic waves on the free-space in a wireless communication.

The sensor module 140 includes at least one of for example, a gesture sensor 140A, a proximity sensor 140B, a grip sensor 140C, a gyro sensor 140D, an acceleration sensor 140E, a geomagnetic sensor 140F, a atmospheric pressure sensor 140G, a temperature/humidity sensor 140H, a hall sensor 140I, a red, green and blue sensor (RGB sensor) 140J, an illumination sensor 140K, a biometric sensor 140L, an ultra violet sensor (UV sensor) 140M or a stylus detector 140N. The sensor module 140 measures a physical quantity or sense an operational status of the hardware 140, and converts the measured or the sensed information into an electric signal. Additionally/alternatively, the sensor module 140 further includes, for example, an E-nose sensor (not shown), an electromyography sensor (EMG sensor, not shown), an electroencephalogram sensor (EEG sensor, not shown), a fingerprint sensor or the like. The sensor module 140 further includes a control circuit for controlling at least one sensor which is included therein.

The user input module 150 includes a touch panel 152, a (digital) pen sensor (for example, a digitizer) 154, a key 156 or an ultrasonic input device 158. The touch panel 153 recognizes a touch input through at least one of an electrostatic type, a resistive type, an infrared type or an ultrasound type. The touch panel 152 further includes a controller that is not shown. In the case of the electrostatic type, it is possible to input by proximity recognition as well as a direct touch. The touch panel 152 also further includes a tactile layer, and here, the touch panel 152 may provide a user with a tactile response.

The (digital) pen sensor 154 is realized using, for example, a separate sheet for recognition or at least one of an electrostatic type, a resistive type, an infrared type or an ultrasound type that is a same or a similar type as a touch input by a user. For example, a keypad or a touch key is used as the key 156. The ultrasonic input device 158 is a device capable of sensing a micro acoustic wave in a terminal and identifying data through a pen that generates an ultrasonic signal, and may perform a wireless identification. The hardware 100 also receives a user input from external devices (for example, a network computer or server) that is connected thereto using the communication module 130.

The display module 160 includes a panel 162 or a hologram 164. The panel 162 is, for example, a liquid-crystal display (LCD), a thin film transistor liquid crystal display (TFT LCD), a passive-matrix organic light-emitting diode (PM-OLED), an active-matrix organic light-emitting diode (AM-OLED) or the like. The panel 162 is realized so as to have flexibility, transparency, or wearability. The panel 162 is also comprised of a touch panel 152 and one module. The hologram 164 shows three-dimensional images in the air using the interference of light. The display module 160 further includes a control circuit for controlling the panel 162 or the hologram 164.

The interface 170 includes a high-definition multimedia interface (HDMI) 172, a universal serial bus (USB) 174, a projector 176 or a D-subminiature (D-sub) 178. Additionally or alternatively, the interface 170 includes, for example, a secure digital (SD)/multi-media card (MMC) or an infrared data association (IrDA) that is not shown.

The audio codec 180 converts a voice into an electric signal, and vice versa. The audio codec 180 converts voice information that is input or output through a speaker 182, a receiver 184, an earphone 186, a microphone 188 or the like to the electric signal.

The camera module 191 is a device capable of photographing images and videos, and in accordance with an embodiment, includes at least one image sensor (for example, a front lens or a rear lens) or an image signal processor (ISP, not shown).

The power management module 195 manages electric power of the hardware 100. Although not shown, the power management module 195 includes, for example, a power management integrated circuit (PMIC), a charger integrated circuit (charger IC) or a battery fuel gauge.

The PMIC is mounted in an intergraded circuit or a SoC semiconductor. A charging type is classified into a wire charging type and a wireless charging type. The charger IC charges a battery, and prevent the inflow of over-voltage or over-current from a charger. The charger IC includes a charging IC for at least one of the wire charging type or the wireless type charging type. The wireless charging type includes, for example, a magnetic resonance type, a magnetic induction type, an electromagnetic type or the like, and additional circuits, for example, a coil loop, a resonance circuit, a rectifier or the like is added for the wireless charging.

The battery gauge measures for example, a remaining amount of the battery 196, or voltage, current or temperature of the battery 196 during charging. The battery 196 generates electricity to supply electric power, and for example, be a rechargeable battery.

The indicator 197 displays specific states of the hardware 100 or a part (for example, AP 111) of the hardware 100, for example, a boot state, a message state, a charge state or the like. The motor 198 converts an electric signal into a mechanical vibration. Although not shown, a micro control unit (MCU) controls the sensor module 140.

Although not shown, the hardware 100 includes a processing unit (for example, a GPU) for supporting a mobile TV. The processing unit for the mobile TV process media data according to specifications, such as a digital multimedia broadcasting (DMB), a digital video broadcasting (DVB), a media flow or the like.

The terms of the above-described components of the hardware according to an embodiment are different according to the type of the hardware. The hardware according to an embodiment includes at least one of the above-described components, and some of the components is omitted or additional other components is further included therein. Some of the hardware according to an embodiment are coupled to each other to construct one entity, and thus the entity performs functions of the corresponding components prior to be coupled to each other in the same manner.

Figure 2:
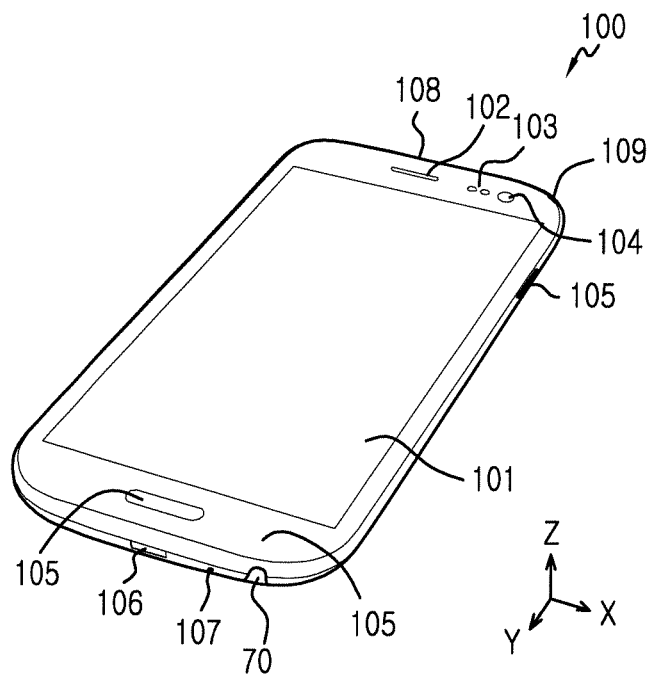
FIG. 2 is a perspective view illustrating an example electronic device according to this disclosure.

FIG. 2 is a perspective view illustrating hardware of an example electronic device according to this disclosure.

Referring to FIG. 2, the electronic device 100 includes a touch screen 101, a speaker 102 (for example, a speaker 182), at least one sensor 103 (for example, a sensor module 140), a camera 104 (for example, a camera module 191), at least one key 105 (for example, a key 156), an external port 106 (for example, an interface 170), a microphone 107 (for example, a microphone 188), a jack 108, an antenna 109 or a stylus 70.

The touch screen 202 includes a window that is not shown, a touch panel (for example, 152), a display panel (for example, 162) or a digitizer (for example, a pen sensor 154). The window is transparent and disposed on the touch panel, and project an image from the display panel into the outside. The touch panel is disposed on a lower portion of the window, and recognizes a touch input.

The speaker 102 (for example, the speaker 18) outputs an electrical signal as sound.

At least one sensor 103 measures a physical quantity or sense an operational state of the electronic device 100 to convert the measured or sensed information into an electrical signal. The at least one sensor 103 is mounted on a specific location. The at least one sensor 103 includes at least one of a gesture sensor, a proximity sensor, a grip sensor, a gyro sensor, an acceleration sensor, a geomagnetic sensor, a atmospheric pressure sensor, a temperature or humidity sensor, a hall sensor, a red, green and blue sensor (RGB sensor), an illumination sensor, a biometric sensor, or an ultra violet sensor (UV sensor).

The camera 104 is a device for photographing images and video clips, and includes at least one image sensor, an image signal processor (ISP, not shown) or a flash LED (not shown).

The key 105 includes a pushing key or a touch key. The key 105 includes a key capable of adjusting volume or a key capable of turning on or off the power.

The external port 106 is used for a port to which a high-definition multimedia interface (HDMI), a universal serial bus (USB), a projector or a d-subminiature (D-sub) is connected, or a port for charging.

The microphone 107 converts sound into an electrical signal.

The jack 108 electrically connects plugs, such as an earphone, an earset or the like. The jack 108 is covered with a lid when not used.

The antenna 109 (for example, a digital multimedia broadcasting antennae (DMB antenna)) is pulled into the outside of the hardware 100 and thus extended.

The stylus 70 is a tool for inducing a touch input with respect to a pen sensor 154 that is not shown, and is detached.

Figure 3:
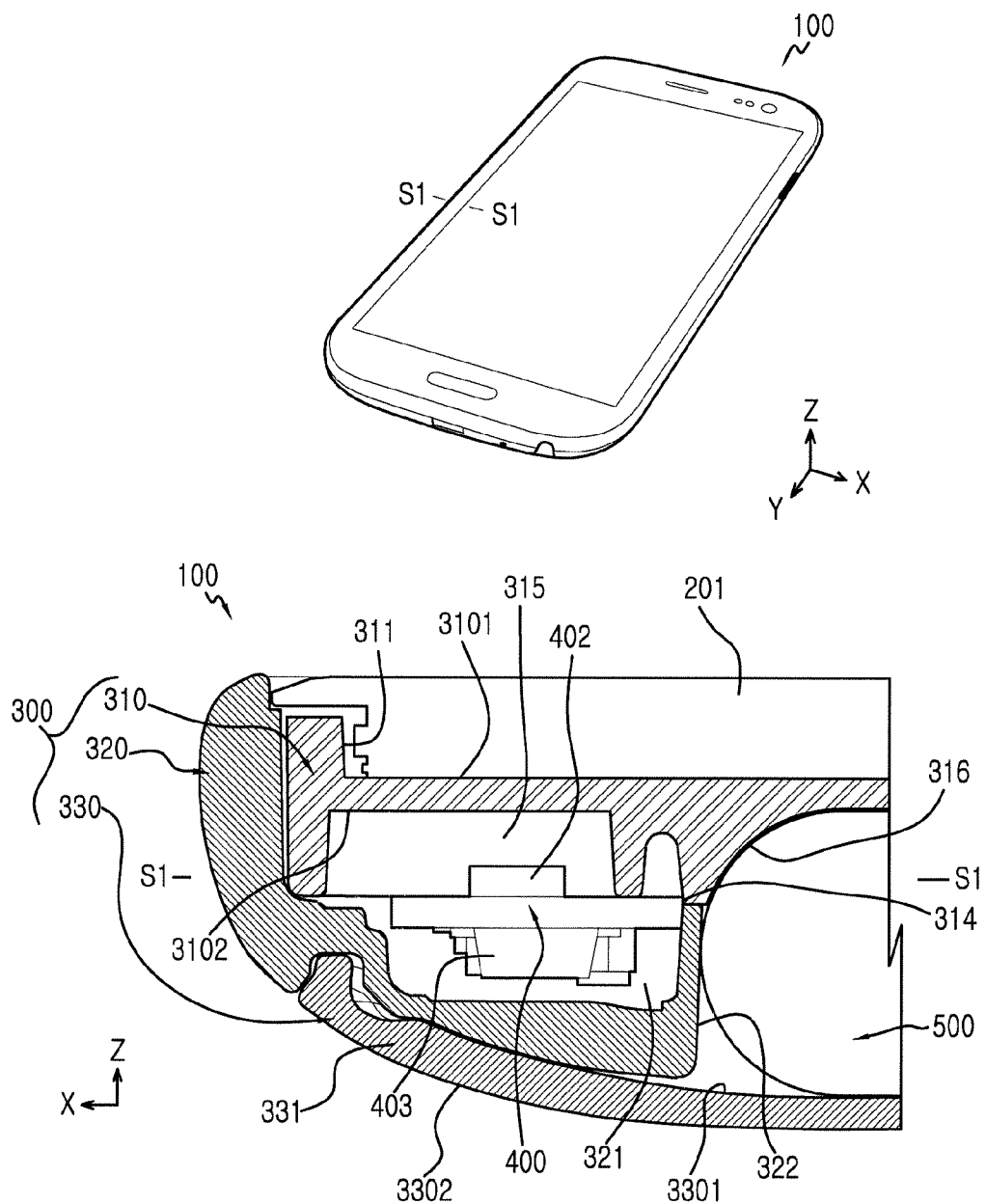
FIG. 3 is a partial cross-sectional view partaken along line "S1-S1" of an example electronic device according to this disclosure.

FIG. 3 is a partial cross sectional view partaken along line "S1-S1" of an example electronic device according to this disclosure. Referring to FIG. 3, the portion corresponding to line "S1-S1" includes a touch screen 210, a housing 300, a main circuit board 400 or a battery 500 (for example, 196).

The touch screen 201 includes a plurality of laminated elements (for example, a window, a touch panel 152, a panel or a pen sensor 162 or the like).

The housing 300 includes a bracket (of a first case frame) 310, a rear case (or a second case frame) 320 or a battery 330.

The bracket 310 is a mounting plate on which a plurality of electronic components is mouthed. The bracket 310 is a frame for fixing or supporting a plurality of electronic components (for example, a processor 110, a memory 120, a SIM card 114, an audio codec 180, a speaker 182, a receiver 184, a microphone 188, a camera module 191, an indicator 197, a motor 198, a power management module 185, a battery 196, a communication module 130, a user input module 150, a display module 160, an interface 140, a sensor module 140 or the like). The bracket 310 is molded of a non-metallic material or a metallic material. The bracket 310 includes a first surface (not shown) formed on an upper portion thereof and a second surface (not shown) formed on a lower portion thereof. The first surface and the second surface of the bracket 310 are mounting surfaces for mounting electronic component thereon. The first surface and/or the second surface includes various surfaces, such as a flat surface or a curved surface. The bracket 310 mounts a display module 200 thereon. The bracket 310 mounts a main circuit board 400 thereon. The bracket 310 includes a plurality of grooves for mounting a plurality of components thereon. For example, the bracket 310 includes a mounting groove 311 for mounting the touch screen 201 on an upper portion 3101 thereof. The bracket 310 includes a mounting groove 314 for mounting the main circuit board 400 on a lower portion 3102 thereof. The bracket 310 includes an electronic component receiving groove 315 for receiving electronic components 402 that protrude upward from the main circuit board 400 (for example, toward the bracket 310). The bracket 310 includes a battery receiving groove 316 for receiving a portion of the battery 500 and having a container shape that is downward concaved on the lower portion 3102. The bracket 310 includes at least one metal portion (for example, a metal brim, a metal coating or the like) which is not shown and is able to be electrically connected to ground of the main circuit board 400.

The rear case 320 is coupled to the bracket 310 (for example, by a snap-fit coupling or a bolt coupling). Also, in various embodiments, the rear case 310 is also integrally provided with the battery cover 330 without being provided as a separate piece. The rear case 320 covers a plurality of components that are fixed to the bracket 310. The rear case 320 covers at least a portion of the main circuit board 400 that is fixed to the bracket 310. The bracket 310, the rear case 320, and the main circuit board 400 is coupled to each other by a bolt coupling manner. The rear case 320 includes an electronic component receiving groove 321 for receiving electronic components 403 that protrude downward from the main circuit board 400 (for example, toward the rear case 320). The rear case 320 includes a battery penetration portion 322 enabling the battery 500 to pass therethrough. As shown, the battery penetration portion 322 has a shape that penetrates the rear case 320 from top to bottom to be opened, and communicates with the battery receiving groove 316 of the bracket 310 which has a container shape. When the bracket 310 and the rear case 320 are coupled to each other, the battery receiving groove 316 of the bracket 310 and the battery penetration portion 322 of the rear case 320 forms a space of a container shape. The battery penetration portion 322 of the rear case 320 has a container shape capable of receiving the entire battery 500 as itself, and thus the battery receiving grove 316 of the bracket may not be necessary. Furthermore, the battery receiving groove 316 has a container shape capable of receiving the entire battery 500 as itself, and thus the battery penetration portion 322 of the rear case 320 may not be necessary.

The battery cover 330 is coupled to the rear case 320, and form a rear surface of the electronic device 100. The battery 330 cover has a curved-shape.

The battery cover 330 includes a glass layer 331 and a plurality of laminated elements which are not shown and are disposed on an upper portion or on a lower portion of the glass layer 331. The plurality of laminated elements has various physical properties (for example, optical, electrical, mechanical or thermal properties). The plurality of laminated elements uses such physical properties to endow the glass layer 331 with various functions. For example, at least one laminated element provides a set with a coupling means. At least one laminated element improves the safety of the user when the glass layer is damaged. At least one laminated element has a heat-dissipating property. At least one laminated element shields electronic noise. In addition, the glass layer 331 is endowed with a variety of other functions from the laminated elements.

The battery cover 330 includes an adhesive layer that is not shown. The adhesive layer is disposed on an upper portion 3301 or a lower portion 3302 of the glass layer 331. The adhesive layer attaches one laminated element to the other laminated element. The adhesive layer is transparent. As other examples, the adhesive layer is also dyed using a dye, a pigment, a coloring matter, a fluorescent material, a phosphorescent substance or the like that develops a predetermined color. Such an adhesive layer includes a hot melt adhesive or a pressure sensitive adhesive (PSA).

The battery cover 330 includes a plastic layer that is not shown. The plastic layer is disposed on the upper portion or the lower portion of the glass layer 331. The plastic layer is attached to the glass layer 331 with the adhesive layer in between. The plastic layer is molded of a material having high mechanical strength and high thermal stability. The plastic layer is molded of a polyethylene terephthalate (PET), a polycarbonate (PC), a polyethylene (PE), a polypropylene (PP) or the like.

The battery cover 330 includes a pattern layer that is not shown. The pattern layer is disposed on the upper portion or the lower portion of the glass layer 331. The pattern layer includes various patterns (for example, a flat pattern or a three-dimensional pattern) that are attached to or printed on an upper surface or a lower surface of at least one laminated element. The pattern layer is molded through an ultraviolet molding (UV molding). The pattern layer that is to be molded by the UV-molding has a pattern corresponding to a pattern formed on a mold. The pattern of the mold is formed through a machining, a laser machining, a photolithography or the like. The laser machining forms a pattern through a method including melting and vaporizing an inner surface of the mold using a high temperature laser. The photolithography forms a pattern through depositing, coating, exposing, developing and etching processes using a pattern mask having a photosensitive property. The pattern layer is irradiated by external light and thus expresses a metallic texture. The pattern of the pattern layer also expresses a hairline. The pattern layer is irradiated through the glass layer 331 and thus viewed in three-dimension.

The battery cover 330 includes a metallic layer that is not shown. The metal layer is disposed on the upper portion 3301 or the lower portion 3302 of the glass layer 331. The metallic layer is formed by a method of depositing or coating a metal (for example, Sn, Al, Si, Ti, TiC, TiN, TiCB, $Al_2O_3$ or the like). The metallic layer is formed through a physical vapor deposition (PVD) or a chemical vapor deposition (CVD). The metallic layer is irradiated by external light to express a metallic texture. The metallic layer is irradiated through the glass layer 331 and viewed in three-dimension.

The battery cover 330 includes a shading layer that is not shown. The shading layer is disposed on the upper portion 3301 or the lower portion 3302 of the glass layer 331. The shading layer is attached to a lower surface of the metallic layer. The shielding layer prevents a plurality of electronic components (for example, the battery 500, memory sockets, bolts or the like) between the rear case 320 and the battery cover 330 from being irradiated by light. The shading layer includes a black component absorbing light without reflecting light. The shading layer is a layer that is printed with a black color. The shading layer is an adhesive that includes a black component. The shading layer includes a black film and a material of an adhesive component. The black film has a separate pattern or a pattern of a material that is printed thereon and thus improves appearance quality.

In addition, the battery cover 330 includes other various laminated elements disposed on the upper portion 3301 or the lower portion 3302 of the glass layer 331.

Figure 4:
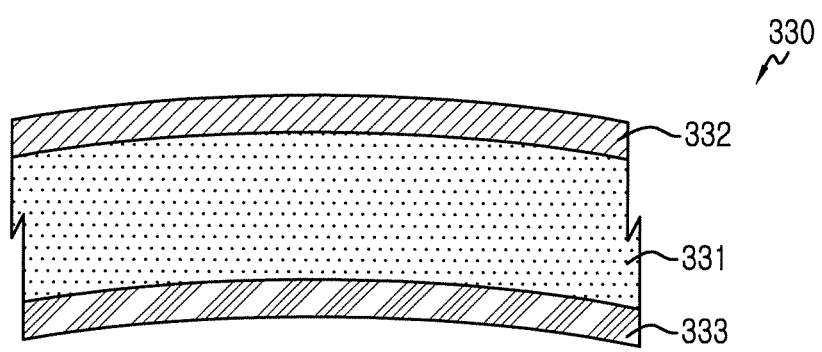
FIG. 4 is a main portion cross-sectional view illustrating an example battery cover according to this disclosure.

FIG. 4 is a main portion cross-sectional view illustrating an example battery cover according to this disclosure.

Referring to FIG. 4, the battery cover includes a glass layer 331, an upper layer 332, and a lower layer 333.

The glass layer 331 includes a shape that is upward curved. The glass layer 331 is molded through methods, such as a thermal forming or a computerized numerical control (CNC). Such a glass layer 331 is molded of tempered glass. The glass layer 331 is transparent or has a predetermined color.

The upper layer 332 is disposed on at least a portion (for example, an entire surface) of an upper surface of the glass layer. The upper layer 332 has a shape that is upward curved. The upper layer 332 includes at least one laminated element. The upper layer 322 has a different material from that of the glass layer 331. The upper layer 332 also includes a structure in which a plurality of laminated elements having different materials from each other are not vertically overlapped with each other but horizontally disposed parallel to each other.

The lower layer 333 is disposed on at least a portion (for example, an entire surface, a brim region or the like) of a lower surface of the glass layer 331. The lower layer 333 is a shape that is upward curved. The lower layer 333 includes at least one laminated element. The lower layer 322 has a different material from that of the glass layer 331. The lower layer 332 includes a structure in which a plurality of laminated elements having different materials from each other are not vertically overlapped with each other but horizontally disposed parallel to each other.

The upper layer 332 or the lower layer 333 includes a screen printed layer that is formed through a screen printing. The screen printed layer is formed on a surface (for example a flat surface or a curved surface) of the glass layer 331. The screen printed layer is formed through a method of transferring at least one (for example, one to eight) ink layers to an object (to-be-printed object) (for example, the glass layer 331) with a primer layer in between. Here, the primer layer represents a layer formed of a primer material. The thickness of at least one ink layer may not be limited. For example, the ink layer is also printed thick with rough and opaque ink, and thus concealment of the ink layer with respect to a ground is improved. Also, at least one ink layer includes various types of inks (for example, oil ink, aqueous ink or the like). The at least one ink layer has light resistance. Such a screen printed layer realizes various visual expressions (for example, color, glossy, non-glossy or the like). The thickness of the screen printed layer may not be less than 100 µm.

The upper layer 332 or the lower layer 333 includes a pad printed layer formed through a pad printing (or, a tampo printing). The pad printed layer is formed on a surface (a flat surface or a curved surface) of the glass layer 331. The pad printed layer is formed through a method of transferring at least one (for example, one to eight) ink layer to an object (for example, the glass layer 331) with the primer layer in between. The pad printed layer is formed on the curved surface of the glass layer 331. The thickness of the pad printed layer may not be more than 100 µm.

The upper layer 332 or the lower layer 333 includes a printed layer formed through an offset printing, a gravure printing, a flexography or an ink-jet printing.

The printed layer formed through the above described printing methods (for example, the screen printing, the pad printing, the offset printing, the gravure printing, the flexography or the ink-jet printing) expresses various visual designs (for example, a logo or the like).

The upper layer 332 or the lower layer 333 includes a spray coated layer formed through a spray painting. As an example, a spray printing process includes attaching the glass layer 331 to a jig that is not shown, and then rotating the jig at a constant speed at the front side of a spraying apparatus that is not shown. The coated layer having a uniform thickness is formed through such the processes. The spray coated layer is formed through a method of applying at least one (for example, one to six) painting layer on an object (to-be-applied object) (for example, the glass layer 331). A painted layer that is finally applied among a plurality of painted layers includes a transparent urethane, a transparent sealant or a similar material to the transparent or the transparent sealant. At least one painted layer of the spray coated layer includes a material shielding electronic noise. The thickness of the spray coated layer may not be more than 100 µm.

The upper layer 332 or the lower layer 333 includes a PVD coated layer formed through a physical vapor deposition (PVD). For example, the PVD coated layer is deposited on a to-be-coated object (for example, the glass layer 331) using aluminum plasma.

The upper layer 332 or the lower layer 333 includes an anti-fouling layer or anti-fingerprint layer (AF layer). The AF layer is disposed on an outer surface of the battery cover 330. The AF layer is formed using methods, such as a spraying, a dipping, depositions (for example, PCD, CVD or an atomic layer deposition (ALD)) or the like. The thickness of the AF layer may not be more than 30 µm.

The upper layer 332 or the lower layer 333 includes an anti-reflection layer (AR layer). When an air gap between the battery cover 330 and adjacent elements (for example, the rear case 320, the battery 500 or the like) is less than or equal to a predetermined thickness (for example, no air gap), the AR layer is disposed on the upper layer 332 (for example, an upper surface of the glass layer 331) of the battery cover 330. Also, when the air gap between the battery cover 330 and adjacent elements (for example, the rear case 320, the battery 500 or the like) is more than or equal to a predetermined thickness, a pair of AR layers is formed on the upper layer 332 and the lower layer 333 of the battery cover 330, respectively. The AR layer reduces the amount of reflected light or refracted light. The AR layer is formed using methods, such as a thermal spraying, a dipping, depositions (PCD, CVD or ALD) or the like. The thickness of the AR layer may not be more than 30 µm.

The upper layer 332 or the lower layer 333 includes an easy clean coated layer (for example, an oleophobic coated layer or hydro oleophobic coated layer). The easy clean coated layer reduces adhesion of pollution sources (for example, a fingerprint, liquid (water or oil), bacteria or the like). The easy clean coated layer prevents a scratch caused by a user. The easy clean coated layer is formed using methods, such as the thermal spraying, the dipping, depositions (PCD, CVD or ALD) or the like. The thickness of the clean coated layer may not be more than 30 µm.

The upper layer 332 or the lower layer 333 includes a safety layer (for example, a polyvinyl butyral layer (PVB layer)). The safety layer prevents the glass layer 331 from being dispersed into a number of pieces when the glass layer 331 is damaged, and thus prevent the user from being injured. The safety layer is formed of a polymer-based material. The safety layer includes an anti-shatter coated layer (ASC layer). The safety layer (for example, the ASC layer) is applied using a method, such as a spray painting. The safety layer (for example, the ASC layer) is formed upon completion of all visual decoration processes. The safety layer (for example, the ASC layer) is comprised of one single polymer layer. The thickness of the safety layer may not be more than 150 µm.

The upper layer 332 or the lower layer 333 includes an anti-scratch layer. The anti-scratch layer prevents a scratch caused by the user. The anti-scratch layer is formed using methods, such as the thermal spraying, the dipping, depositions (PCD, CVD or ALD) or the like. The thickness of the anti-scratch layer may not be more than 30 µm.

The upper layer 332 or the lower layer 333 includes a heat-dissipating layer (for example, a graphite sheet). The heat-dissipating layer uniformly disperses heat generated by the electronic device 100 throughout an entire surface and thus prevents a heat concentration phenomenon.

The upper layer 332 or the lower layer 333 includes an electronic noise shielding layer (for example, an electro magnetic interference (EMI)).

The upper layer 332 or the lower layer 333 includes an antenna (for example, a near field communication antenna (NFC antenna)). The antenna of the battery 330 is electrically connected to the main circuit board 400.

The upper layer 332 or the lower layer 333 includes a magnetic layer (for example, a ferrite sheet layer). The magnetic layer has magnetism or affects an electromagnetic field. The magnetic layer is disposed below the antenna, and lead to a reliable communication. The magnetic layer prevents an eddy current from being generated in adjacent metals by an electromagnetic field from the above described antenna. The electromagnetic field is transferred to the magnetic layer, and thus high resistance (high permeability or a high microwave absorption rate) of the magnetic layer prevents the eddy current from being generated in the adjacent metals. Since the eddy current is not generated in the adjacent metals, and thus the electromagnetic filed concentrates on a rear surface of the electronic device 100, a near field communication (NFC) may not be deteriorated.

The upper layer 332 or the lower layer 333 includes other various laminated elements.

The thickness of the battery cover is 0.4 mm to 1.0 mm.

Figure 5:
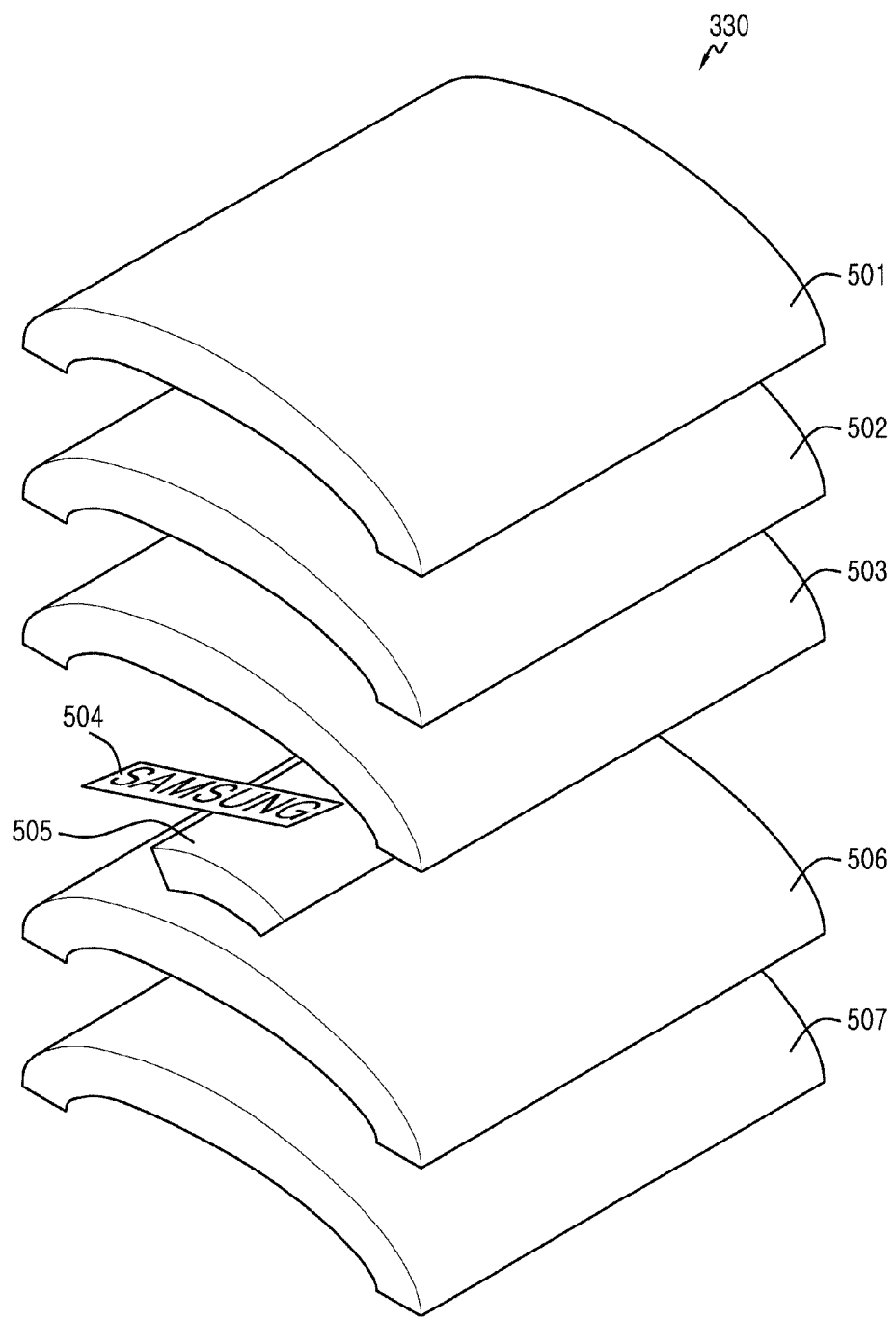
FIG. 5 is a view showing a laminated structure of an example battery cover according to this disclosure.

FIG. 5 is a view showing a laminated structure of an example battery cover according to this disclosure.

Referring to FIG. 5, the battery cover 330 includes an anti-fouling or anti-fingerprint layer (AF layer) 501, an anti-reflection layer (AR layer) 502, a printed layer 504, a physical vapor deposition layer coated layer (PVD coated layer) 505, a painted layer 506 or a safety layer 507.

The AF layer 501 is disposed above the AR layer 502. The AF layer 501 prevents adhesion of pollution sources (for example, a fingerprint, liquid or the like). The AF layer 501 has water repellency or oil repellency.

The AR layer 502 is disposed under the AF layer 501. The AR layer 502 reduces reflection of light to enable the battery cover 330 to be clearly visible. The AR layer 502 is formed by way of alternately laminating a silicon dioxide ($SiO_2$) and a titanium dioxide (TiO2) on a polymer film (for example, a polyethylene terephthalate (PET) or the like).

The glass layer 503 is disposed under the AR layer 502. The glass layer 503 is diverse according to physical properties (for example, strength, optical property (for example, transmittance), insulation, anti-fouling or the like).

The printed layer 504 is disposed under the glass layer 503. The printed layer 504 is formed on a flat surface or a curved surface of the glass layer 503. The printed layer 504 is formed using the above described printing methods (screen printing, pad printing or the like). Such a printed layer 504 expresses various visual designs (for example, a logo or the like).

The PVD coated layer 505 is disposed under the printed layer 502. The PVD coated layer is formed by way of depositing metals (for example, Sn, Al, Si, Ti, TiC, TiN, TiCB, Al2O3 or the like) on to-be-coated objects (for example, the glass layer 331, a metallic layer or non-metallic layer or the like). Such a PVD layer 505 expresses a metallic texture.

The painted layer 506 is disposed under the PVD layer 505. The printed layer 506 expresses various colors (for example, black color).

The safety layer 506 is disposed under the painted layer 506. The safety layer 507 prevents a dispersal of glass due to the damage of the glass layer 503.

Figure 6:
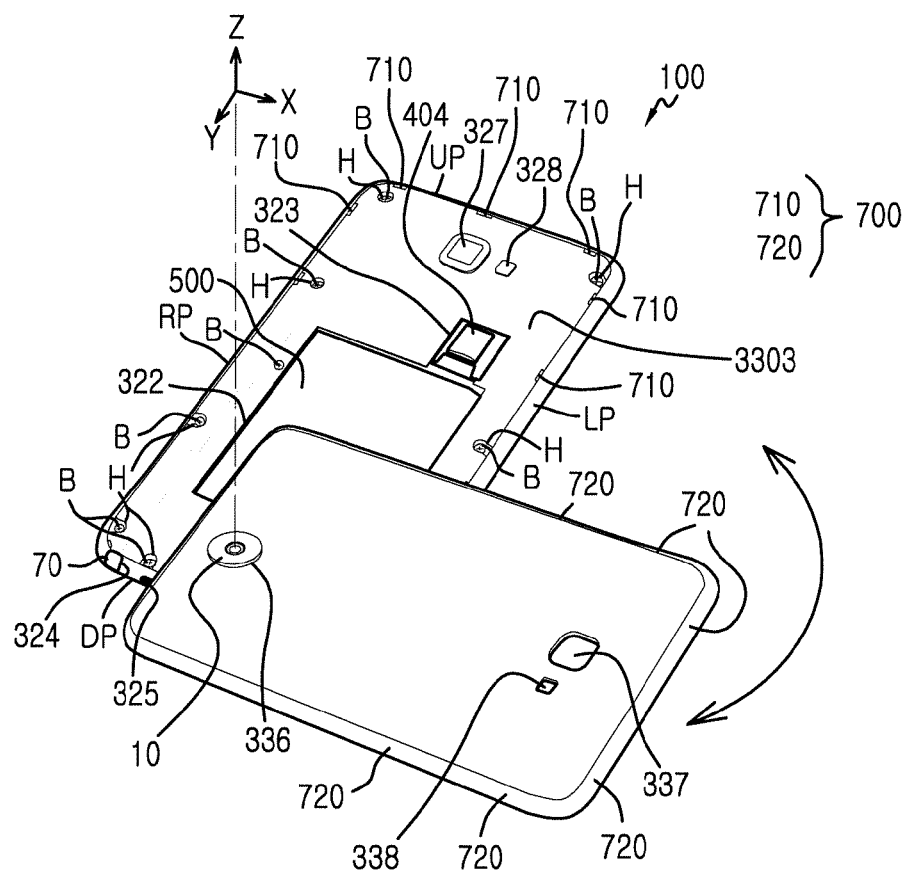
FIG. 6 is a perspective view illustrating an example electronic device according to this disclosure.

FIG. 6 is a perspective view illustrating an example electronic device according to this disclosure.

Referring to FIG. 6, the electronic device 100 includes a rear case 320, a battery cover 330, a pop-up swivel device 10, or at least one tight contact means 700.

The rear case 320 includes a penetration groove 322, a socket penetration groove 323, a stylus entrance 324, a speaker lid 325, a port opening hole 326, a camera window 327, a flash window 328 or a plurality of bolt coupling holes H. The battery penetration groove 322 forms a space for loading a battery 500 therein together with a battery receiving groove 316 of a bracket 310. The socket penetration groove 323 exposes a memory socket 404 to the outside, in which the memory socket 404 is mounted on the main circuit board 400. The stylus entrance 324 is an estuary through which a stylus 70 is loaded or unloaded, and communicates with a receiving space for the stylus 70. The speaker lid 325 is disposed corresponding to the speaker 182 electrically connected to the main circuit board 400, and include a plurality of penetration holes capable of delivering the sound of the speaker 182 therethrough. The port opening hole 326 exposes a socket (for example, an USB socket) to the outside, in which the socket is not shown and is electrically connected the main circuit board. The camera window 327 is disposed corresponding to a camera (for example, the camera module 161) that is to be electrically connected to the circuit board 400, and be transparent to allow light to pass through a lens of the camera 161. The flash window 328 is disposed corresponding to a flash that is to be electrically connected to the main circuit board 400, and be transparent to allow light to pass therethrough. The plurality of bolt coupling holes H is penetrated by a plurality of bolts B. The rear case 320 is coupled to the bracket 310 by the plurality of bolts B.

The battery cover 330 includes a camera hole 337 or a flash hole 338. The camera hole 337 is exposed to the outside by penetrating the camera window 327 of the rear case 320. The flash hole 338 is exposed to the outside by penetrating the flash window 328 of the rear case 320. In other embodiments, the flash hole 338 is omitted, and the flash also emits light through a transparent region of the battery cover 330.

The pop-up swivel device 10 connects the rear case 320 and the battery cover 330. A lower portion of the pop-up swivel device 10 is disposed on the rear case 320, in which the lower portion is not shown. An upper portion of the pop-up swivel device 10 is disposed in a penetration portion 336 of the battery cover 330, in which the lower portion is not shown. The pop-up swivel device 10 is disposed on a region 3303 of a surface of the rear case 320 on which elements (the battery penetration portion 322, the camera window 327, the flash window 328, the bolt coupling hole H or the like) are not disposed. For example, the pop-up swivel device 10 is disposed between the battery penetration portion 322 and a lower side brim DP of the electronic device 100. The battery cover 330 in the closed state moves upward (Z-axis direction) by the pop-up switch 10 and then is separated from the rear case 320, so is opened by rotating to intersect with the rear case 320. The battery cover 220 freely rotates. When the battery cover 300 is opened, a memory card or battery is detached. The battery cover 330 in the open state is closed through a reverse motion with respect to the above described motion.

At least one tight contact means 700 maintains the closed state of the battery cover 330 and increase a tight contact between the battery cover 330 and the rear case 320. When the battery cover 330 is closed by the swivel device 10, at least one tight contact means 700 improves the tight contact between the rear case 320 and the battery cover 330 that is to get out of the influence of the swivel device 10. For example, a mechanical coupling type (for example, snap-fits) is applied in at least one tight contact means 700. Also, a magnetic attraction type is applied in at least one tight contact means 700. Such at least one tight contact means 700 includes a pair of coupling elements 710 and 720 capable of facing-coupled to each other. One coupling element 710 is disposed on the rear case 320. One coupling element 710 is disposed on at least one brim (for example, an upper side brim UP, a lower side brim DP, a right side brim RP or a left side brim LP). Furthermore, one coupling element 710 is disposed on a corner side that connects two brims (for example, upper side brim UP and right side brim RP, or lower side brim DP and left brim LP). One coupling element 710 is disposed at an equal interval. Other coupling element 720 is disposed on the battery cover 330. Other coupling element 720 is attached to battery cover 330 using an attaching means (for example, adhesive or the like). Other coupling element 720 is integrally molded with the battery cover 720 by using at least a portion of the laminated elements described above in FIGS. 4 and 5.

Figure 7:
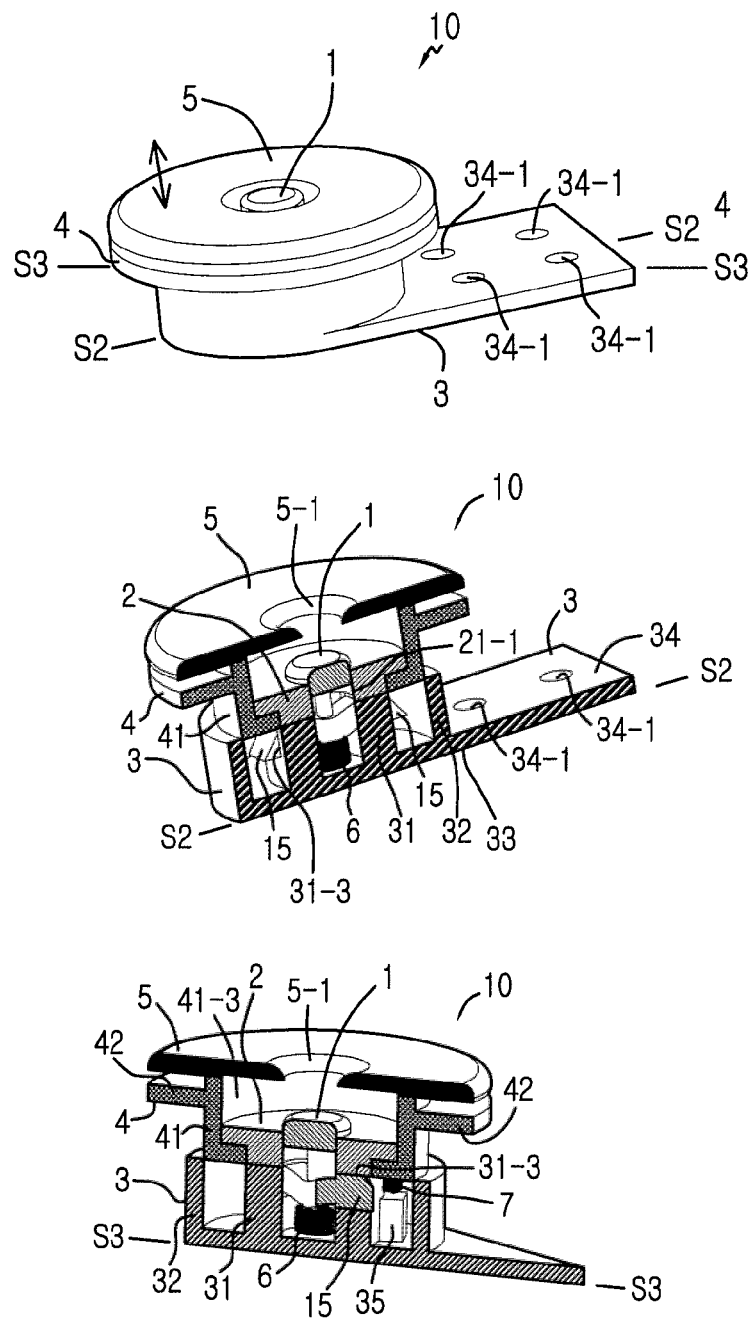
FIG. 7 shows a perspective view and a main portion cross-sectional view illustrating an example pop-up swivel device cover according to this disclosure.

FIG. 7 shows a perspective view and a main portion cross-sectional view illustrating an example pop-up swivel device cover according to this disclosure.

Referring to FIG. 7, the pop-up swivel device 10 includes a button member 1, an upper supporting member 2, a lower supporting member 3, a sliding member 4, a lid member, a center compressing 6, or a satellite compressing spring 7.

The button member 1 is disposed in a space formed by a combination of the upper supporting member 2 and the lower supporting member 3, and move up and down. The button member 1 includes a pair of stoppers 15 capable of slidably moving in a pair of penetration portions 31-3.

The upper supporting member 2 is disposed on an upper portion of the lower supporting member 3. The upper supporting member 2 has a cylindrical shape having a penetration portion 21-1 being open from to bottom.

The lower supporting member 3 is disposed on a lower portion of the upper supporting member 2. The lower supporting member 3 includes double cylindrical wall portions (inner cylindrical wall portion 31, and outer cylindrical wall portion 32) and a horizontal extension portion 34. The double cylindrical wall portions 31 extend upward from a bottom portion 33. The horizontal extension portion 34 extends outwardly in a horizontal direction from the bottom portion 33. The lower supporting member 3 is fixed to the rear case 320 by way of fixing the horizontal extension portion 34 to the rear case 32. The horizontal extension portion 34 includes a plurality of bolt coupling holes 34-1 for bolt coupling the horizontal extension portion 34 to the rear case 32. An inner space surrounded by the inner cylindrical wall portion 31 communicates with a penetration portion 21-1 of the upper supporting member 2. The cylindrical wall portion 31 includes a pair of penetration portions 31-3 allowing the inner space and the outer space to communicate with each other. The pair of stoppers 15 of the button member 1 is inserted into the pair of penetration portions 31-3. The pair of stoppers 15 responds to a user's pushing of the button member 1 to move inside the pair of penetration portions 31-3. The pair of stoppers 15 responds to a user's pushing release of the button member 1 protrudes outside the pair of penetration portions 31-3 of the inner cylindrical wall portion 31.

The sliding member 4 includes a cylindrical wall portion 41. The cylindrical wall portion 41 of the sliding member 4 includes a penetration portion 41-3 being open from top to bottom. The cylindrical wall portion 41 of the sliding member 4 is disposed between the inner cylindrical wall portion 31 and the outer cylindrical wall portion 32 of the lower supporting member 2, and the sliding member 4 slidably moves up and down with respect to the lower supporting member 3. When the sliding member 4 contacts the upper supporting member 2, the sliding member 4 may not move upward any more. When the upper extension portion 42 of the sliding member 4 contacts the outer cylindrical wall portion 32 of the lower supporting member 3, the slide member not move downward any more. Before the user pushes the button member 1, the slide member 4 is stopped by the pair of stoppers 15 of the button member 1 and thus may not move upward any more. On the other hand, when the user pushes the button member 1, the pair of stoppers 15 does not protrude outside the pair of penetrations 31-1, the sliding member 4 moves upward by compression force of the satellite spring 7 to contact the upper supporting member 3 and thus slidably rotate with respect to the upper supporting member 2. Meanwhile, when the sliding member 4 is stopped by the pair of stoppers 15 of the button member 1 and thus may not move upward any more, a protrusion which is formed on a bottom of the sliding member and is not shown is held by a jaw formed between the inner cylindrical wall portion 31 and the outer cylindrical wall portion 32 of the lower supporting member 3, so that the sliding member 4 may not freely rotate. Also, a state not shown in which the battery cover 330 is coupled to the rear case 320 represents a state in which the slide member 4 is stopped by the pair of stoppers 15 of the button member 1 to not move upward any more. When the slide member 4 moves downward, the pair of stoppers 15 of the button member 1 moves inside the pair of penetration portions 31-3 of the lower supporting member 3 due to the sliding member 4.

The center compressing spring 6 is disposed in the inner cylindrical wall portion 31 of the lower supporting member 3. The center compressing spring 6 is disposed under the button member 1, and supports the button member 1. The center compressing member responds to pushing release of the button member 1 to restore the button member 1 to the initial state.

The satellite compressing spring 7 is disposed between the inner cylindrical wall portion 31 and the outer wall portion 32 of the lower supporting member 3. The compressing spring 7 is disposed under the sliding member 4, and elastically supports the sliding member 4.

Figure 8:
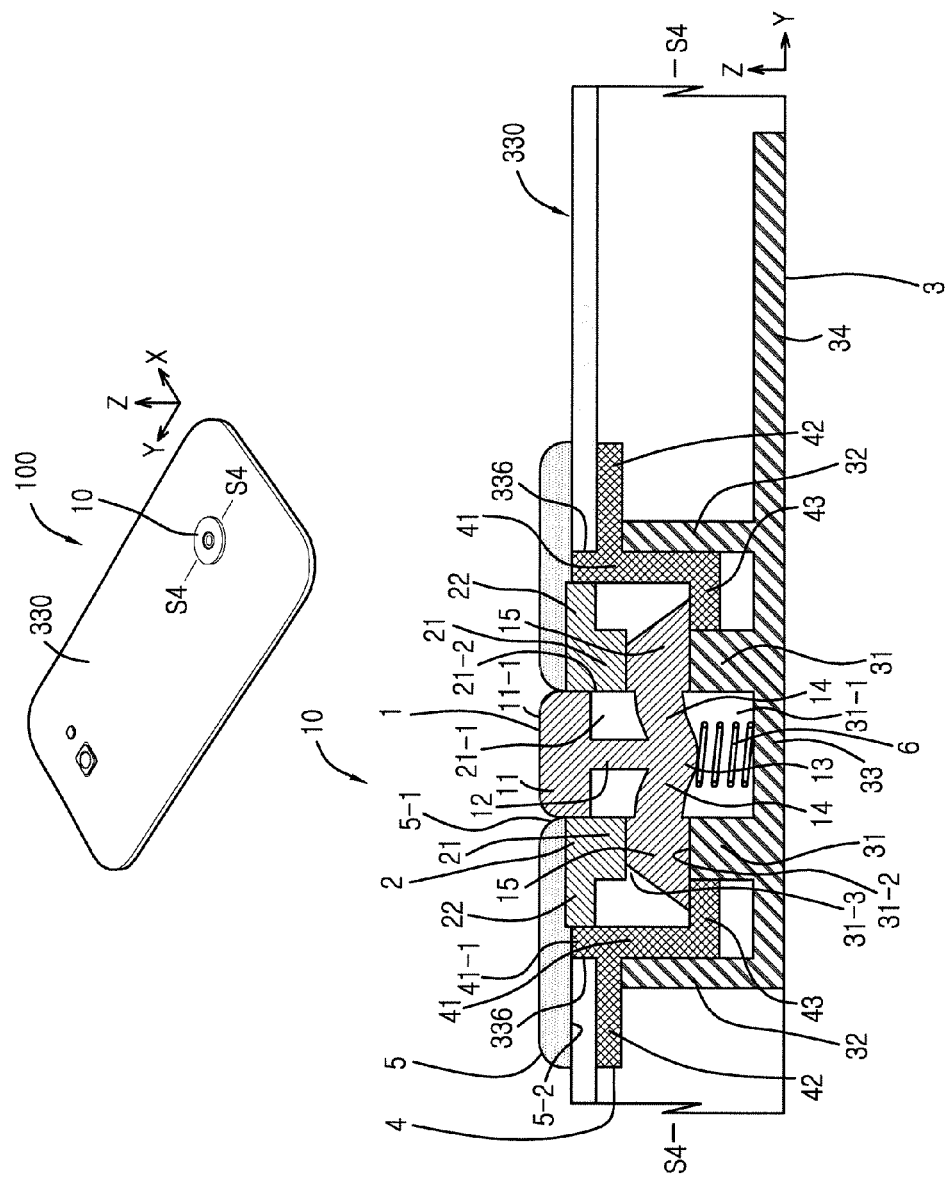
FIG. 8 is a main portion cross-sectional view illustrating an example electronic device according to this disclosure.

FIG. 8 is a main portion cross-sectional view illustrating an example electronic device according to this disclosure. The cross-sectional view of FIG. 8 is a cross-sectional view taken along a vertical direction (where the vertical length is longer than a horizontal length) of an electronic device. Referring to FIG. 8, the electronic device 100 includes a pop-up swivel device 10 and a battery cover 330.

The pop-up swivel device 10 includes a button member 1, an upper supporting member 2, a lower supporting member 3, a sliding member 4, a lid member 5, or a center compressing spring 6.

The button member 1 includes a head portion 11, an upward and downward extension portion 12, a pressing portion 13, a pair of extension portions 14 or a pair of stoppers 15. The head portion 11 generally has a cylindrical shape, and an upper surface (for example, pushing surface) 11-1 thereof is exposed to the outside. The head portion 11 moves up and down with respect to an inner surface 21-2 of a first penetration portion 21-2 of the upper supporting member 2. The upward and downward extension portion 12 extends vertically downward from the head portion 11, and an end portion thereof (pressing portion 130) contacts a center compressing spring 6. The upward and downward extension portion 12 generally has a column shape (for example, s cylinder shape, a square pillar shape or the like). The pressing portion 13 is formed on an end portion of the upward and downward extension portion 12. When the head portion 11 is pressed, the upward downward extension portion 12 moves downward, and the pressing portion presses the center compressing spring 6. The pair of extension portions extends from the pressing portion 13. The pair of extension portions 14 is disposed to face each other, and be flexible. The pair of stoppers 15 is formed on end portions of the pair of the extension portions 14. The pair of stoppers 15 is inserted into a pair of penetration portions 31-3 formed between the upper supporting member 2 and the lower supporting member 3. When the button portion 11 is pressed, the upward and downward extension portion 12 moves downward, the pair of extension portions 14 pulls the pair of stoppers 15, and thus the pair of stoppers 15 is guided by the pair of penetration portions 31-34 to move in a direction in which the pair of stoppers 15 converge to each other. When a pushing of the button portion 11 is released, the button member 11 is restored to the initial state, and the pair of stoppers 15 protrudes outside the pair of penetration portions 31-3. The button member 1 is restored by self-elastic force thereof and additional compression force of the center compression spring 6. The pair of stoppers 15 is also flexible, and is flexibly deformed by movement of the pair of extension portions 14 to smoothly move in the pair of penetration portions 31-3.

The upper supporting member 2 includes a first cylindrical wall portion 21 or an upper extension portion 22. The first cylindrical wall portion 21 includes a first penetration portion 21-1 being open from top to bottom. The button portion 11 of the button member 1 is guided by the first penetration portion 21-1 to move up and down. The upper extension portion 22 extends outwardly in a horizontal direction from an upper portion of the first cylindrical wall portion 21. The upper extension portion 22 has a circular ring shape.

The lower supporting member 3 is disposed (fixed) under the upper supporting member 2. The lower supporting member 3 includes an inner cylindrical wall portion 31 (second cylindrical wall portion), an outer cylindrical wall portion 31 (third cylindrical wall portion) or a bottom portion 34. The second cylindrical wall portion 31 extends upwardly from the bottom portion 33. The second cylindrical wall portion 31 includes an inner receiving portion 31-1 being open upwardly. The inner receiving portion 31-1 communicates with the first penetration portion 21-1 of the upper supporting member 2. The second cylindrical wall portion 31 includes a pair of grooves 31-2. The first cylindrical wall portion 21 of the upper supporting member 2 closes upper side openings of the pair of grooves 31-2, and a pair of penetration portions 31-3 for allowing a space of the inner receiving portion to communicate with a space between the second cylindrical portion 31 and the third cylindrical wall portion is formed. The third cylindrical wall portion 32 extends upwardly from the bottom portion 33. The third cylindrical wall portion 32 is disposed outside the second cylindrical wall portion 31. The bottom portion has a disc shape. The horizontal extension portion 34 extends outwardly in a horizontal direction from the bottom portion 33. The pop-up swivel device 10 is mounted on a rear case 320 by fixing the horizontal extension portion 34 to the rear case 320 not shown. The horizontal extension portion 34 is disposed between the rear case 320 and battery cover 330. Also, the horizontal extension portion 34 is disposed between the rear case 320 and a bracket 310 not shown. For example, the horizontal extension portion 34 is disposed between the rear case 320 and the bracket through a method in which the rear case 320 includes a penetration portion that is not shown, and the third cylindrical wall portion 32 is disposed to penetrate the penetration portion of the rear case 320. The horizontal extension portion 34 is fixed to the rear case 320 using predetermined coupling means (for example, adhesive, bolt coupling or the like).

The sliding member 4 slidably moves (for example, linearly move or rotate) between the upper supporting member 2 and the lower supporting member 3. The sliding member 4 includes a fourth cylindrical wall portion 41, an upper extension portion 42 or a lower extension portion 43. The fourth cylindrical wall portion 41 is disposed between the second cylindrical wall portion 31 and the third cylindrical wall portion of the lower supporting member 3. The fourth cylindrical wall portion 41 is disposed outside the upper supporting member 2. The fourth cylindrical wall portion 41 slidably moves with respect to an inner surface of the lower supporting member 3. An upper end 41-1 of the fourth cylindrical wall portion 41 is disposed between the upper extension portion 22 of the upper supporting member 2 and the battery cover 320. The upper extension portion 42 extends outwardly in a horizontal direction from the fourth cylindrical wall portion 41. The upper extension portion 42 is disposed above the third cylindrical wall portion 32 of the lower supporting member 3. The upper extension portion 42 is formed at a location below the upper end 41-1 of the fourth cylindrical wall portion 41. When the upper extension portion 42 contacts the third cylindrical wall portion 32 of the lower supporting member 3, the sliding member not move downward any more. The lower extension portion 43 extends inwardly in a horizontal direction from the fourth cylindrical wall portion 41. When the button member 1 stays in the initial state, the lower extension portion 43 is disposed below a pair of stoppers 15 protruding outside a pair of penetration portions 31-3. When the lower extension portion 43 contacts the upper extension portion 22 of the upper supporting member 2, the sliding member 4 may not move upwardly any more.

The lid member 5 has a ring-type disc shape, and include second penetration portion 5-1 being open from top to bottom. The upper end 41-1 of the fourth cylindrical wall portion 41 of the sliding member 4 is fixed to a lower surface 5-2 of the lid member 5, and the lid member 5 moves along with the sliding member 4. The second penetration member 5-1 communicates with the first penetration portion 21-1 of the upper supporting member 2. The button portion 11 of the button member 1 penetrates the second penetration portion 5-1.

The center compression spring 6 is disposed below the button member 1, and be received in the inner receiving portion 31-1 of the lower supporting member 3. The center compressing spring 6 is supported by the bottom portion 33 of the lower supporting member 3 to elastically support the pressing portion 13 of the button member 1.

The battery cover 330 includes a penetration portion 336 being open from top to bottom. The battery cover 330 is fixed to the sliding member 4 through a method in which the upper end 41-1 of the sliding member 4 is disposed to penetrate the penetration portion 336 of the battery cover 330. The battery cover 330 is disposed between the upper extension portion 42 of the sliding member 4 and the lid member 5. The battery cover 330 moves along with the sliding member 4 and the lid member 5.

Figure 9:
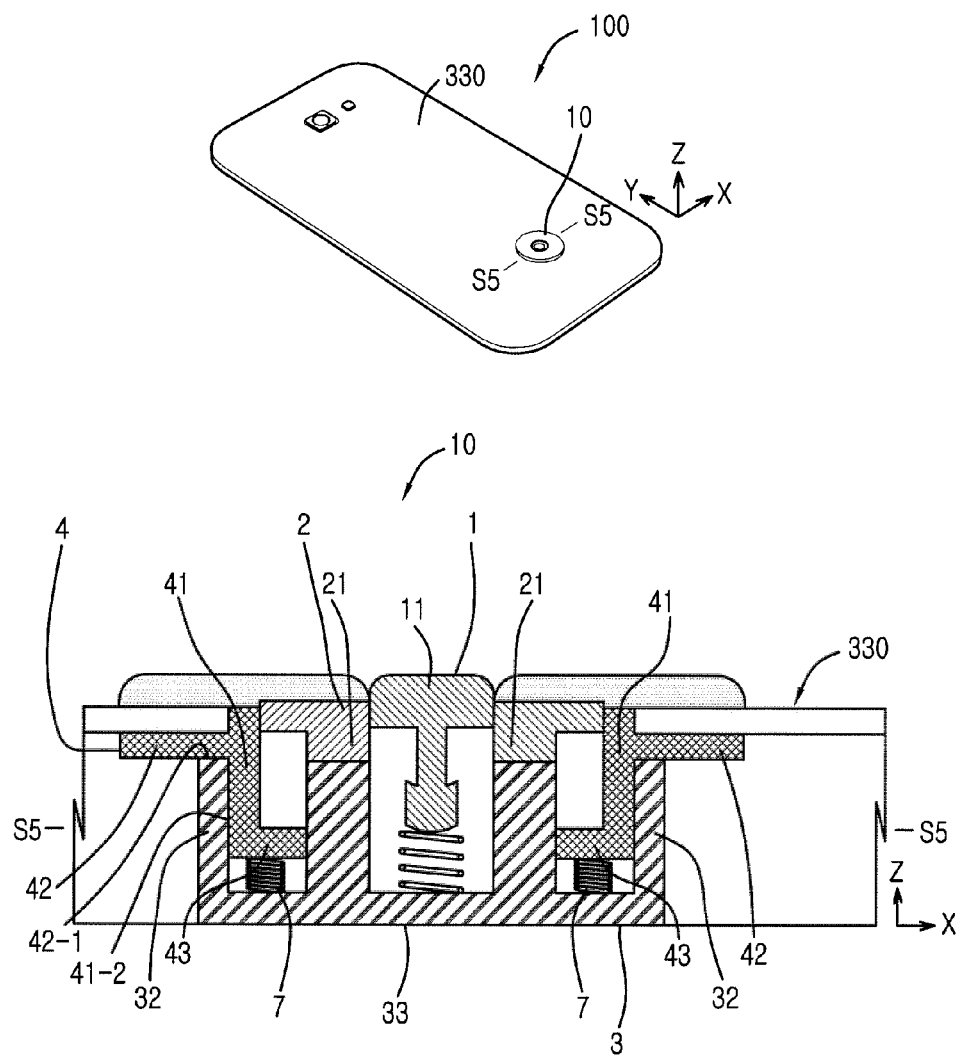
FIG. 9 is a main portion cross-sectional view illustrating an example electronic device according to this disclosure.

FIG. 9 is a main cross-sectional view illustrating an example electronic device according to this disclosure. The cross-sectional view of FIG. 9 is a cross-sectional view taken along a horizontal direction (where the horizontal length is shorter than a vertical length) of an electronic device 10. Referring to FIG. 9, a pop-up swivel device 10 includes a lower supporting member 3, a sliding member 4, or a pair of satellite compression spring 7.

The lower supporting member 3 includes an inner cylindrical wall portion (second cylindrical wall portion) 31, an outer cylindrical wall portion (third cylindrical wall portion) 32, or a bottom portion 33. The second cylindrical wall portion 31 extends upwardly from the bottom portion 33, and contacts the cylindrical wall portion 21 of the upper supporting member 2. The third cylindrical wall portion 32 extends upwardly from the bottom portion 33, and contacts the lower surface 42-1 of the horizontal extension portion 42 of the sliding member 4. The third cylindrical wall portion 32 contacts an outer surface 41-2 of the fourth cylindrical wall portion 41 of the sliding member 4.

The sliding member 4 moves upward with respect to the third cylindrical wall portion 32 of the lower supporting member 3, contact the upper supporting member 2, and become a state capable of rotating with the respect to the upper supporting member 2. Lubricant (for example, grease or the like) is coated on a contact portion between the sliding member 4 and the upper and lower supporting members 2 and 3, and the sliding member smoothly slidably moves (for example, slidably moves or slidably rotates).

The pair of satellite compressing springs 7 is disposed between the second cylindrical wall portion 31 and the third cylindrical wall portion 32 of the lower supporting member 3. The pair of satellite compressing springs 7 is disposed between the lower extension member 43 of the sliding member 4 and the bottom portion 33 of the lower supporting member 3. When the button portion 11 of the button member 1 is pushed, the sliding member 4 slidably moves upward by compression force of the pair of satellite compressing springs 7.

Figure 10:
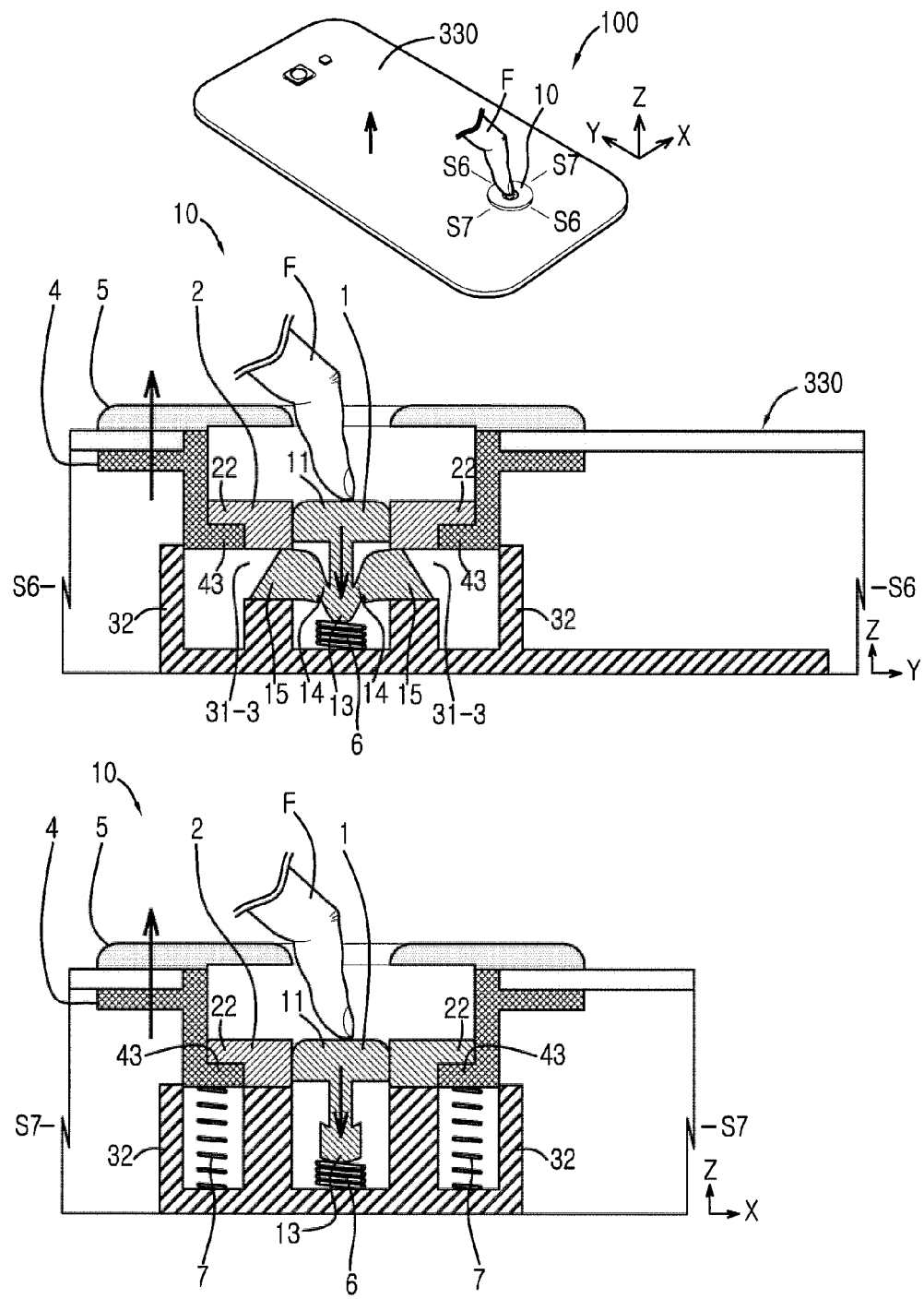
FIG. 10 shows main portion cross-sectional views illustrating an example electronic device in a state in which a button portion of a pop-up swivel device is pushed according to this disclosure.

FIG. 10 shows main portion cross-sectional views illustrating an example electronic device in a state in which a button portion of a pop-up swivel device is pushed according to this disclosure. The upper cross-sectional view is a cross-sectional view taken along a vertical direction, and the lower cross-sectional view is a cross-sectional view taken along a horizontal direction.

Referring to FIG. 10, when the head portion 11 of the button member 1 is pushed by a user's finger, the pressing portion 13 of the button member 1 moves downward to press the center spring 6, the pair of stoppers 15 of the button member 1 do not protrude outside the pair of penetration portions 31-3 of the upper and lower supporting members 2 and 3, and thus the sliding member 4, and the battery cover 330 and the lid member 5 that are coupled to the sliding member 4 moves upward by compression force of the pair of satellite compressing springs 7. Here, force supplied from the pair of the satellite compressing springs 7 releases a tight contact between a pair of coupling elements 710 and 720 of at least one tight contact means (700 in FIG. 6). The upper extension member 22 of the upper supporting member 2 contacts the lower extension portion 43 of the sliding member 4, and thus the sliding member 4 not move anymore and be elastically supported by the pair of satellite compressing springs to maintain position thereof.

Figure 11:
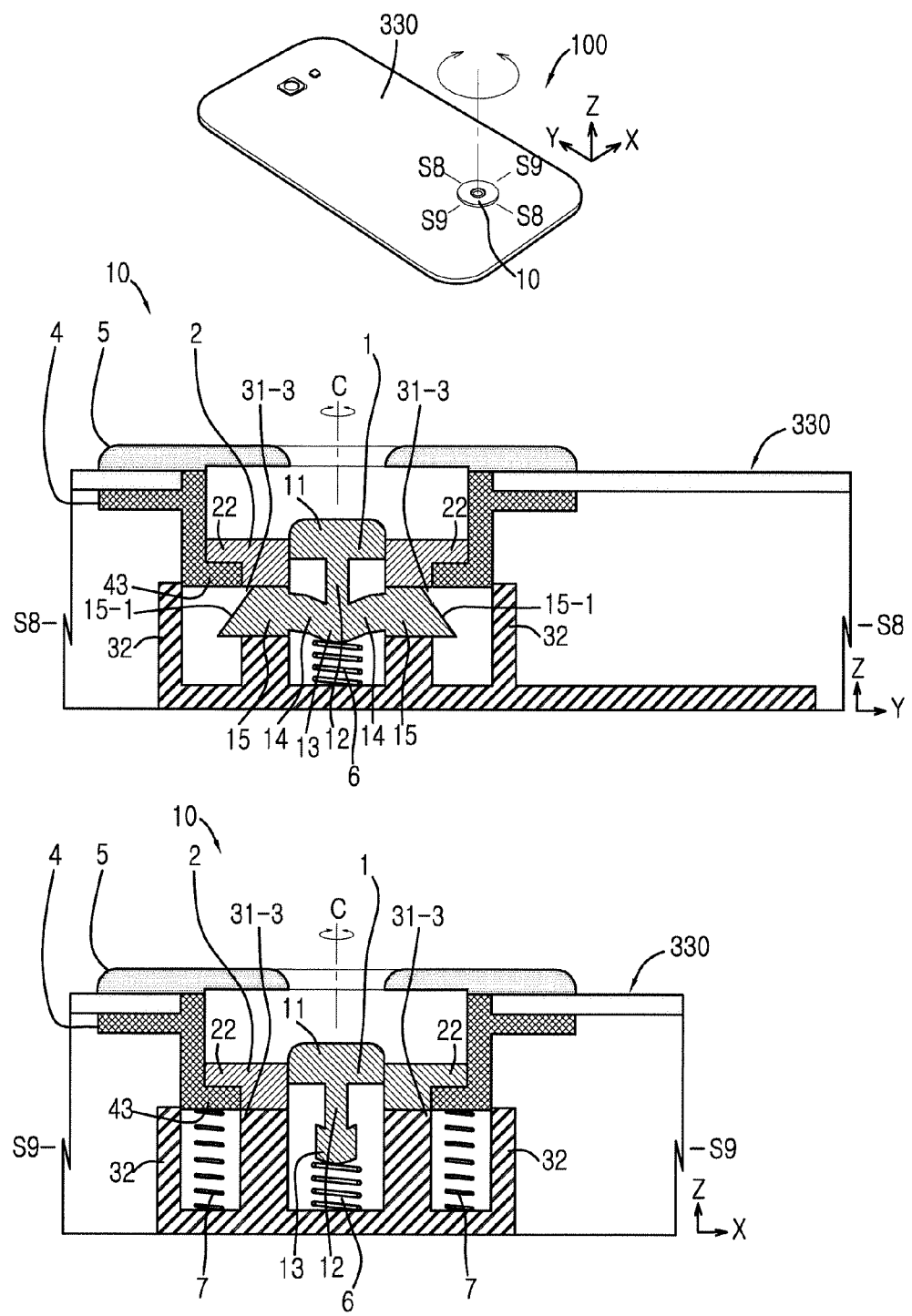
FIG. 11 shows main portion cross-sectional views illustrating an example electronic device in the state in which a pushing of a button portion of a pop-up swivel device is released according to this disclosure.

FIG. 11 shows main portion cross-sectional views illustrating an example electronic device in a state in which a pushing of a button portion of a pop-up swivel device is released according to this disclosure. The upper cross-sectional view is a cross-sectional view taken along a horizontal direction of the electronic device 10, and the lower cross-sectional view is a cross-sectional view taken along a vertical of the electronic device 10.

Referring to FIG. 11, when a pushing of the button member 1 is released, the button member is restored to the initial state by compression force of the center compressing spring 6. The pair of stoppers 15 again protrudes outside the pair of penetration portions 13-3 of the upper and lower supporting members 2, 3. The sliding member 4 is elastically supported by the pair of satellite compressing springs 7 to maintain a state being contacted with the first cylindrical wall portion 21 and the upper extension member 22, and slidably rotates with respect to the upper supporting member 2. The battery cover 330 rotates to be opened by way of intersecting with the rear case 302 using slidable rotation of the sliding member 4.

Upper surfaces of the pair of stoppers 15 includes an inclined plane 15-1 having gradually lowering shape going toward the outside. When the sliding member 4 moves downward while pressing the pair of satellite compressing springs 7, the lower extension portion 43 of the sliding member 4 presses the inclined surfaces 15-1 of the pair of stoppers 15 of the button member, and the pair of stoppers 15 moves inside the pair of penetration portions 31-3 of the upper and lower supporting members 2, 3. When the pair of stoppers 15 of the button member 1 move inside the pair of penetration portions 31-3 of the upper and lower supporting members 2, 3, remaining portions of the button member 1 (for example, a button portion 11, an upward and downward extension portion 12 and a pair of extension members 13) moves. For example, the pair of extension portions 13 of the button member 1 moves inside the pair of stoppers 15 to be bent. When the lower extension portion 43 of the sliding member 4 departs from the inclined planes 15-1 of the pair of stoppers 15 of the button member 1, the pair of stoppers 15 of the button member 1 again protrudes outside the pair of penetration portions 31-3 of the upper and lower supporting members 2 and 3. Here, the lower extension portion 43 of the sliding member 4 contacts lower surfaces of the pair of stoppers 15 of the button member 1, and thus the sliding member 4 may not move downward any more. The battery cover 330 in the open state rotates to match a vertical direction of the electronic device 100, and then is closed by being coupled to the rear case 320 in the state shown in FIG. 8 using movement of the sliding member 4 described above.

Figure 12:
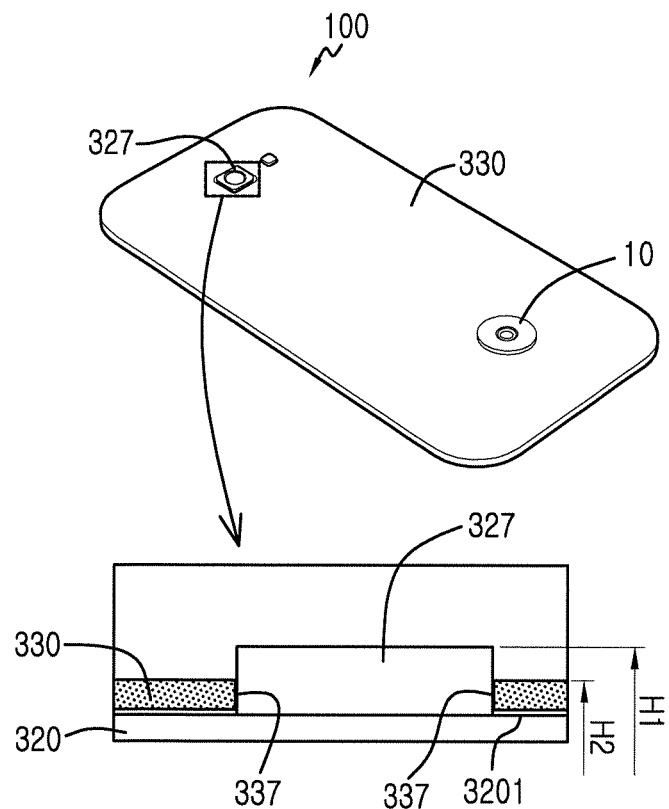
FIG. 12 is a main portion cross-sectional view illustrating an example electronic device according to this disclosure.

FIG. 12 is a main portion cross-sectional view illustrating an example electronic device according to various embodiments of the present disclosure.

Referring to FIG. 12, the electronic device includes a rear case 320, a battery cover 330, or a pop-up swivel switch 10.

The rear case 320 includes a camera window 327. The camera window 327 relatively protrudes with respect to a surface 3201 of the rear case 320. The height H1 of the camera window 327 is higher than that H2 of the battery cover 330. The camera window 327 also plays a role in reducing a damage of the battery cover 330. For example, when the electronic device 100 drops on the floor, the camera window 327 reaches the floor first, and thus prevents the damage of the battery cover 330.

The battery cover 330 includes a camera hole 337. The battery cover 330 is coupled to the rear case 320 by allowing the camera window 327 of the rear case to penetrate the camera hole 337 of the battery cover 330.

The pop-up swivel device 10 is disposed on one side of a horizontal direction (in which the vertical length is longer than a horizontal length) of an electronic device 100. The camera window 327 of the rear case 320 and the camera hole 337 of the battery cover 330 is disposed on the other side of a vertical direction (in which the vertical length is longer than a horizontal length) of the electronic device 100. A coupling of the camera window 327 and the camera hole 337 guides a location where the battery cover installed.

Figure 13:
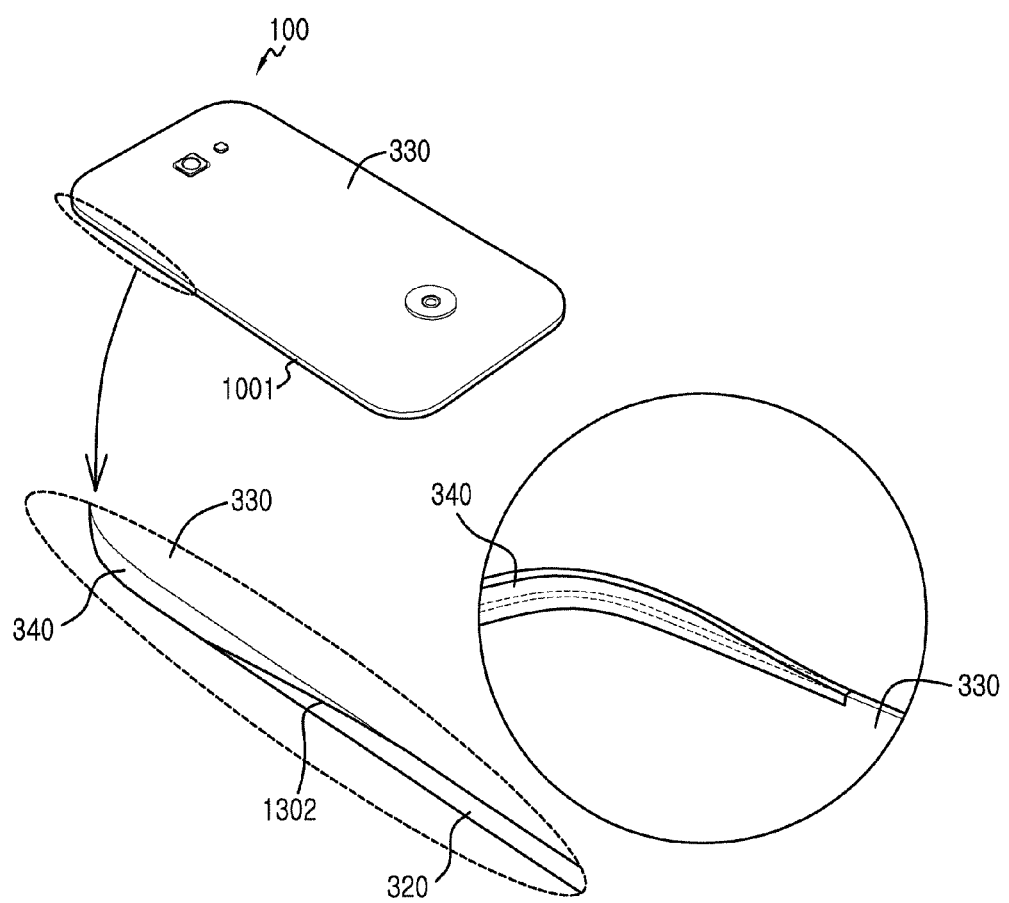
FIG. 13 is a perspective view illustrating an example electronic device according to this disclosure.

FIG. 13 is a perspective view illustrating an example electronic device according to this disclosure.

Referring FIG. 13, the electronic device 100 includes a battery cover 330 a plastic member 340 or a rear case 320.

The battery cover 330 is molded through a method in which a plurality of laminated elements are laminated on the glass layer 331 as shown in FIG. 4.

The plastic member 340 is attached to at least a portion of a brim of the battery cover 330. The plastic member 340 allows the electronic device 100 to look beautifully. The plastic member 340 prevents a damage of the battery cover 330. The plastic member 340 constitutes a portion of a side surface 1001 of the electronic device 100.

A portion 1302 connected to the rear case 320 and the plastic member 340 has a curved shape. An outer surface of the rear case 320 and an outer surface of the plastic member 340 is smoothly connected to each other.

Figure 14:
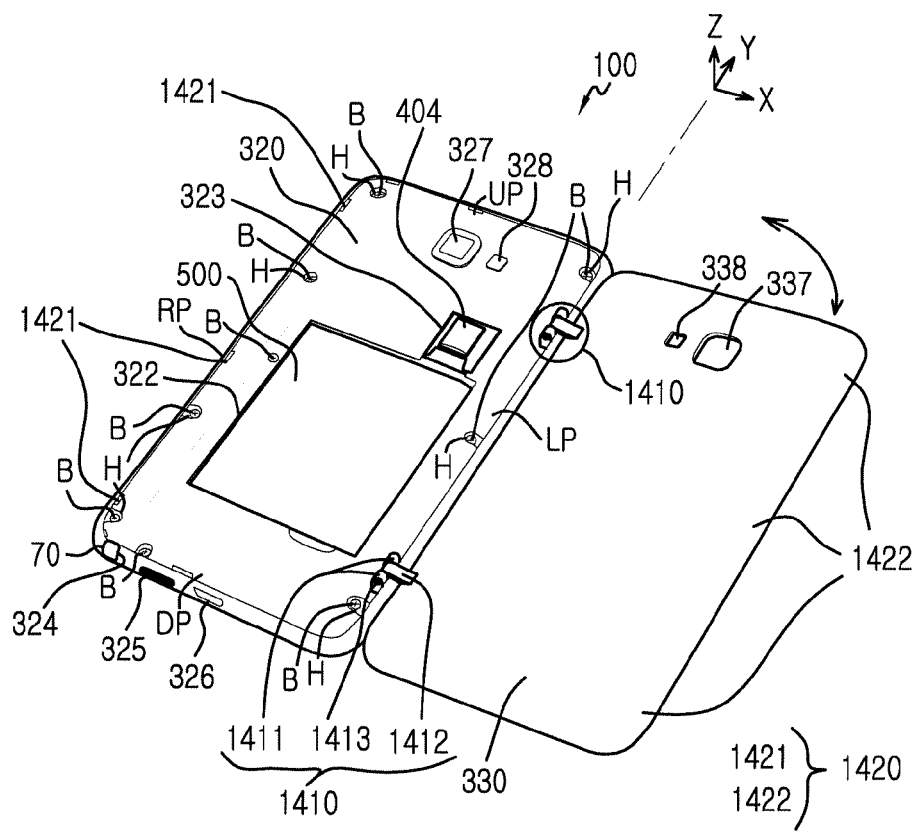
FIG. 14 is a perspective view illustrating an example electronic device according to this disclosure.

FIG. 14 is a perspective view illustrating an example electronic device according to this disclosure.

Referring to FIG. 14, the electronic device 100 includes a rear case 3320, a battery cover 330, at least one hinge connecting unit 1410, or at least one tight contact means 1420.

The rear case 320 includes a battery penetration grove 322, a socket penetration groove 323, a stylus entrance 324, a speaker lid 325, a port opening hole 326, a camera window 327, a flash window 328, or a plurality of bolt coupling holes as described with reference to FIG. 6.

The battery cover 330 is a camera hole 337 or a flash hole 338. The camera hole 337 is exposed to the outside by penetrating the camera window 327 of the rear case 320. The flash hole 338 is exposed to the outside by penetrating the flash window 328 of the rear case 320.

At least one hinge connection portion 1410 hinge-connects the battery cover 330 to the rear case 320. The battery cover 330 is opened or closed with respect to the rear case 320 by the hinge connecting unit 1410. For example, the battery cover 330 rotates with respect to one side vertical brim (being opened or closed in a horizontal direction).

The at least one hinge connecting unit 1410 includes a pair of fixing arms 1411, a hinge arm 1412, or a shaft 1413. The pair of fixing arms 1411 is disposed on the rear case 302. The pair of fixing arms 1411 is integrally molded with the rear case 320. Also, the pair of fixing arms 1411 is fixed to the rear case using separate coupling means (for example, adhesive, bolt coupling or the like). The pair of fixing arms 1411 is disposed on a left side brim LP or a right side brim RP having relatively wider width than an upper side brim UP or a lower side brim DP. The pair of fixing arms 1411 includes a pair of penetration holes that are not shown and is penetrated by the shaft 1400. The hinge arm 1412 is attached to the battery cover 330 using coupling means (for example, adhesive, bolt coupling or the like). The hinge arm 1412 is integrally molded with the battery cover 330 using at least a portion of the above described laminated elements. The hinge arm 1412 includes an extension portion that is not shown and extends between the pair of fixing arms 1411. The extension portion includes a penetration hole that is not shown and is penetrated by the shaft 1413.

The shaft 1413 is disposed in a pair of penetration holes of the fixing arms 1411 and a penetration hole of the hinge arm 1412.

At least one tight contact means 1420 maintains a closing state of the battery cover 330. The at least one tight contact means 1420 includes a pair of coupling elements 1421 and 1422 capable of being coupled to face each other. For example, the at least one tight contact means 1420 uses a mechanical coupling type (for example, snap-fits). The at least one tight contact means 1420 uses a magnetic attraction type. One coupling element 1421 is disposed on the rear case 320. The one coupling element 1421 is disposed on at least one brim (for example, upper side brim UP, lower side brim or right side brim) where the pair of hinge arms 1411 of at least one hinge connecting unit 1410 are not disposed. Also, the one coupling element 1421 is on a corner connecting two brims (for example, upper side brim UP and right side brim RP, or lower side brim LP and right side brim RP). The other coupling element 1422 is disposed on the battery cover 330. The other coupling element 1422 is attached to the battery cover 330 using coupling means (for example, adhesive, bolt coupling or the like). The other coupling element 1422 is integrally molded with the battery cover 330 using at least a portion of the above described laminated elements.

Figure 15:
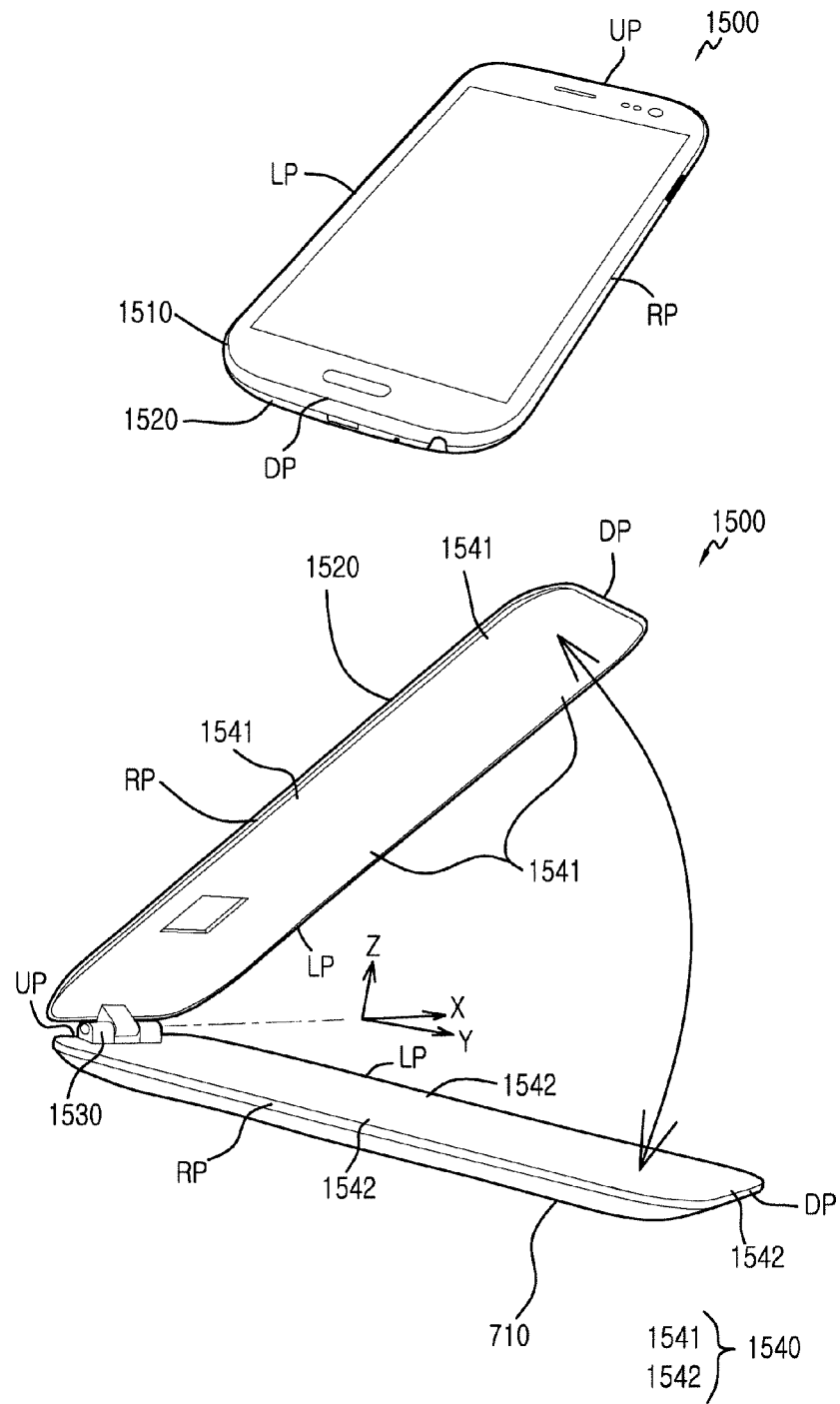
FIG. 15 is a perspective view illustrating an example electronic device according to this disclosure.

FIG. 15 is a perspective view illustrating an example electronic device according to this disclosure.

Referring to FIG. 15, the electronic device 1500 (for example, an electronic device 100) includes a main body 1510, a sub body 1520, a hinge connecting unit 1530, or a tight contact means 1540.

The main body 1510 includes the bracket 310, the rear case 320, the main circuit board 400, the battery 500, or other electronic components (at least one processor 110, the SIM card 114, the memory 120, the communication module 130, the sensor module 140, the user input module 150, the display module 160, the interface 170, the audio codec 180, the camera module 191, the power management module 195, the battery 196, the indicator 197, the motor 198 or the like) described above.

The hinge connecting unit 1530 hinge-connects the sub body 1520 to the main body 1510. The hinge connecting unit 1530 includes elements of the hinge connecting unit 1420 described above, but a location where the hinge connecting unit 1530 is disposed is different. For example, the hinge connecting unit 1530 is disposed on a horizontal brim (for example, upper side brim UP or lower side brim DP) of one side of the electronic device 100.

The sub body 1520 (for example, a battery cover 330 or the like) is opened or closed in a vertical direction by the hinge connecting unit 1530.

At least one tight contact means 1540 maintains a closed state of the sub body 1520. The at least one tight contact means 1540 includes components of the tight contact means 1420 described above.

In accordance with various embodiments of the present disclosure, the electronic device 100 includes a housing (for example, a rear case 320), a glass cover (for example, a battery cover 330) installed in at least a portion of the housing, and an opening/closing unit (for example, a pop-up swivel device 10 or a hinge connection unit 1410) installed to open or close the glass cover 330 from the housing 320.

In accordance with various embodiments of the present disclosure, the glass cover (for example, the battery cover 330) is opened or closed by rotating to intersect with the housing (for example, the rear case 320).

In accordance with various embodiments of the present disclosure, the glass cover (for example, the battery cover 330) rotates after being separated from the housing (the rear case 320).

In accordance with various embodiments of the present disclosure, the opening/closing unit (for example, the pop-up swivel device 10) includes a cylindrical sliding member (for example, the sliding member 4) attached to a lower portion of the glass cover (for example, the battery cover 330) and a cylindrical supporting member (for example, the upper supporting member 2 or the lower supporting member 3) attached to an upper portion of the housing (for example, the rear case 320), and inserted into a hollow portion (the penetration portion 41-3) of the cylindrical sliding member 4, in which the cylindrical sliding member 4 is able to slidably move up and down or slidably rotate with respect to the cylindrical supporting members 2 and 3. The glass cover 330 is opened by rotating to intersect with the housing 320 by slidable rotation of the cylindrical sliding member 4 after being separated from the housing by slidable movement upward of the cylindrical sliding member 4.

In accordance with various embodiments of the present disclosure, the cylindrical supporting member (for example, the lower supporting member 3) includes an inner cylindrical wall portion 31 and an outer cylindrical wall portion 32 disposed outside the inner cylindrical supporting member 31. The cylindrical sliding member (for example, the sliding member 4) includes a sliding cylindrical wall portion 41 capable of slidably moving between the inner cylindrical wall portion 31 and the outer cylindrical wall portion 32 of the cylindrical supporting member 3.

In accordance with various embodiments of the present disclosure, the cylindrical sliding member (for example, the sliding member 4) includes an upper extension portion 42 extending outwardly in a horizontal direction from an upper portion of the sliding cylindrical wall portion 41. The upper extension portion 42 of the cylindrical sliding member (for example, the sliding member 4) is disposed above the outer cylindrical wall portion 32 of the cylindrical supporting member (for example, the lower supporting member 3). When the upper extension portion 42 of the cylindrical sliding member (for example, the sliding member 4) and the outer cylindrical wall portion 32 of the cylindrical supporting member (for example, the lower supporting member 3) contact each other, the cylindrical sliding member 4 may not be slidably movable downward any more.

In accordance with various embodiments of the present disclosure, the glass cover (for example, the battery cover 330) includes a penetration portion (for example, a penetration portion 336) being open from top to bottom. The glass cover (for example, the battery cover 330) is fixed to the cylindrical sliding member 4 through a method in which an upper end portion 41-1 of the sliding cylindrical wall portion 41 of the cylindrical sliding member (for example, the sliding member 4) is disposed to penetrate the penetration portion 336 of the glass cover (for example, the battery cover 330), and the upper extension portion 41-1 of the cylindrical sliding member 4 is attached to a lower surface of the penetration portion 336 of the glass cover 330.

In accordance with various embodiments of the present disclosure, the cylindrical supporting member (for example, the upper supporting member 2) includes an upper extension portion (for example, an upper extending portion 22) extending outwardly in a horizontal direction from an upper portion of the inner cylindrical wall portion (for example, the cylindrical wall portion 21). The cylindrical sliding member (for example, the sliding member 4) includes a lower extension portion 43 extending inwardly in a horizontal direction from a lower portion of the sliding cylindrical wall portion 41. The upper extension portion 22 of the cylindrical supporting member (for example, the upper supporting member 2) and the lower extension portion 43 of the cylindrical sliding member 4 is disposed between the inner cylindrical wall portion (for example, the cylindrical wall portions 21 and 31) of the cylindrical supporting member (for example, the upper supporting member 2 or lower supporting member 3) and the sliding cylindrical wall portion 41 of the cylindrical sliding member 4. When the lower extension portion 43 of the cylindrical sliding member (for example, the sliding member 4) contacts the upper extension portion 22 of the cylindrical supporting member (for example, the upper supporting member 2), the cylindrical sliding member 4 is not slidably movable upward any more.

In accordance with various embodiments of the present disclosure, the electronic device includes at least one satellite compressing spring 7 disposed between the inner cylindrical wall portion 31 and the outer cylindrical wall portion 32 of the cylindrical supporting member (the lower supporting member 3) and disposed below the lower extension portion 43 of the cylindrical sliding member (for example, the sliding member 4). The cylindrical sliding member 4 is elastically supported by the at least one satellite compressing spring 7 to slidably move up and down.

In accordance with various embodiments of the present disclosure, the electronic device includes at least one penetration portion 31-3 formed in the inner cylindrical wall portion 31 of the cylindrical supporting member (the lower supporting member 3), a button body (for example, the button portion 11 and the upward and downward extension portion 12) being movable up and down in a hollow portion (the penetration portion 21-1 and the inner receiving portion 31-1) of the inner cylindrical wall portion (e.g., the cylindrical wall portions 21 and 31) of the cylindrical supporting member (for example, the lower supporting member 3) and having an upper end portion thereof exposed to the outside, a stopper 15 extending from the button bodies 11 and 12 and inserted into the at least one penetration portion 31-3 of the cylindrical supporting member (for example, the lower supporting member 3), and a center compressing spring 6 installed in the cylindrical supporting member (the lower supporting member 3) and disposed below the button bodies 11 and 12 to elastically support the button body 11, 12. When the stopper 15 protrudes outside the at least one penetration portion 31-3 of the cylindrical supporting member (for example, the lower supporting member 3), the lower extension portion 43 of the cylindrical sliding member 4 tightly contacts an lower portion of the stopper 15 by compressive force of the at least one satellite compressing spring 7, and a position of the cylindrical sliding member 4 is maintained, and when the button body 11, 12 moves downward by external force, the stopper 15 is pulled away from the button body 11, 12 and moves inside the at least one penetration portion 31-3 of the cylindrical supporting member 3, and the cylindrical sliding member 4 slidably moves upward by compressive force of the at least one satellite compressing spring 7.

In accordance with various embodiments of the present disclosure, an upper surface of the stopper 15 includes an inclined plane. Motions in which the upward-moved cylindrical sliding member (for example, the sliding member 4) moves downward, and the lower extension portion 43 of the cylindrical sliding member 4 tightly contacts the lower portion of the stopper 15 includes pre-motion in which the stopper 15 is pressed by the lower extension portion 43 of the cylindrical sliding member 4 through the inclined plane 15-1 and moves inside the at least one penetration portion 31-3 of the cylindrical supporting member (for example, the lower supporting member 3), and post-motion in which when the lower extension portion 43 of the cylindrical sliding member 4 departs from the inclined plane 15-1 of the stopper 15, the stopper 15 again protrudes outside the at least one penetration portion 31-3 of the cylindrical supporting member 3.

In accordance with various embodiments of the present disclosure, the opening/closing unit (for example, the hinge connection unit 1410) hinge-connects one side of the glass cover (for example, the battery cover 330) to the housing (for example, the rear case 320).

In accordance with various embodiments of the present disclosure, the electronic device includes a tight contact means 700 having a pair of coupling elements 710, 720 installed on the housing (the rear case) and the glass cover (for example, the battery cover 330), respectively, and being capable of being coupled to face each other.

The tight contact means uses at least one of a mechanical coupling type or a magnetic attraction type.

In accordance with various embodiments of the present disclosure, the glass cover (for example, the battery cover 330) includes at least one penetration portion 337, and the housing (for example, the rear case 320) includes at least one protrusion portion (for example, a camera window 327) corresponding to the at least one penetration portion 337. When the glass cover 330 is closed, the at least one protrusion portion penetrates the at least one penetration portion 337 of the glass cover 330, and protrude from an outer surface of the glass cover 330.

In accordance with various embodiments of the present disclosure, the protrusion portion (for example, the camera window 327) of the housing (for example, the rear case 320) includes a camera (for example, a camera module 191).

In accordance with various embodiments of the present disclosure, at least one detachable component is disposed in the housing, and be exposed to the outside when the glass cover is opened. At least one detachable component includes a memory card or a battery 500.

In accordance with various embodiments of the present disclosure, the glass cover (for example, the battery cover 330) includes a curved surface in at least a part thereof.

In accordance with various embodiments of the present disclosure, the glass cover (for example, the battery cover 330) includes a glass layer 331, and at least one laminated element (an upper layer 332 or a lower layer 331) disposed on an upper portion or a lower portion of the glass layer 331.

In accordance with various embodiments of the present disclosure, the glass layer 331 is molded using a thermal forming or a computerized numerical control (CNC).

In accordance with various embodiments of the present disclosure, the at least one laminated element (for example, the upper layer 332 or the lower layer 333) includes a non-metallic material or a metallic material.

In accordance with various embodiments of the present disclosure, the at least one laminated element (for example, the upper layer 332 or the lower layer 333) includes a colored material or a colorless material.

In accordance with various embodiments of the present disclosure, the at least one laminated element (for example, the upper layer 332 or the lower layer 333) includes at least one of a layer formed by printing, a layer formed by spray printing, or a layer by vapor deposition.

In accordance with various embodiments of the present disclosure, the at least one laminated element (for example, the upper layer 332 or the lower layer 333) includes at least one of an anti-fouling, or anti-fingerprint layer (AF layer), an anti-reflection layer (AR layer), an easy clean coating layer, a glass dispersion preventing layer, or an anti-scratch layer.

A cover (for example, a battery cover) formed of glass is easily opened or closed, and thus provide a user satisfaction.

While the disclosure has been shown and described with reference to certain preferred embodiments thereof, it will be understood by those skilled in the art that various changes in form and details is made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. An electronic device comprising:
a housing that defines an outer surface of the electronic device;
a glass cover installed in at least a portion of the housing; and
an opening and closing unit configured to open or close the glass cover from the housing,
wherein the opening and closing unit comprises:
a cylindrical sliding member attached to the glass cover; and
a cylindrical supporting member attached to the glass cover, and inserted into a hollow portion of the cylindrical sliding member,
wherein the cylindrical sliding member is slidably movable up and down or slidably rotatable with respect to the cylindrical supporting member,
wherein the glass cover is configured to open by way of rotating to intersect with the housing by slidable rotation of the cylindrical sliding member after being separated from the housing by upward slidable movement of the cylindrical sliding member,
wherein the cylindrical supporting member comprises an inner cylindrical wall portion and an outer cylindrical wall portion disposed outside the inner cylindrical supporting member, and
wherein the cylindrical sliding member comprises a sliding cylindrical wall portion configured to slidably move between the inner cylindrical wall portion and the outer cylindrical wall portion of the cylindrical supporting member.

2. The electronic device of claim 1, wherein the glass cover is configured to open or close by rotating to intersect with the housing.

3. The electronic device of claim 2, wherein the glass cover is configured to be rotatable after being separated from the housing.

4. The electronic device of claim 1, wherein the cylindrical sliding member further comprises an upper extension portion extending in an outer horizontal direction from an upper portion of the sliding cylindrical wall portion,
wherein the upper extension portion of the cylindrical sliding member is disposed above the outer cylindrical wall portion, and
when the upper extension portion of the cylindrical sliding member and the outer cylindrical wall portion of the cylindrical supporting member contact each other, the cylindrical sliding member is configured to not slidably move further downward.

5. The electronic device of claim 4, wherein the glass cover comprises a penetration portion configured to open from top to bottom,
wherein the glass cover is fixed to the cylindrical sliding member in a manner that an upper end portion of the sliding cylindrical wall portion of the cylindrical sliding member is disposed to penetrate the penetration portion of the glass cover, and the upper extension portion of the cylindrical sliding member is attached to a lower surface of the penetration portion of the glass cover.

6. The electronic device of claim 1, wherein the cylindrical supporting member comprises an upper extension portion extending outwardly in a horizontal direction from the inner cylindrical wall portion, and the cylindrical sliding member comprises a lower extension portion extending inwardly in a horizontal direction from a lower portion of the sliding cylindrical wall portion,
wherein the upper extension portion of the cylindrical supporting member and the lower extension portion of the sliding cylindrical member are disposed between the inner cylindrical wall portion of the cylindrical supporting member and the sliding cylindrical wall portion of the cylindrical sliding member, and
when the lower extension portion of the cylindrical sliding member contacts the upper extension portion of the cylindrical supporting member, the cylindrical sliding member is configured to not slidably move further upward.

7. The electronic device of claim 6, further comprising at least one satellite compressing spring disposed between the inner cylindrical wall portion and the outer cylindrical wall portion of the cylindrical supporting member, and below the lower extension portion of the cylindrical sliding member,
   wherein the cylindrical sliding member is configured to slidably move up and down by an elastic support of the at least one satellite compressing spring.

8. The electronic device of claim 7, further comprising:
   at least one penetration portion formed in the inner cylindrical wall portion of the cylindrical supporting member;
   a button body configured to move up and down in a hollow portion of the inner cylindrical wall portion of the cylindrical supporting member, and having an end portion exposed to the outside;
   a stopper extending from the button body, and inserted into the at least one penetration portion of the cylindrical supporting member; and
   a center compressing spring installed in the cylindrical supporting member, and disposed below the button body to elastically support the button body,
   wherein when the stopper protrudes outside the at least one penetration portion of the cylindrical supporting member, the lower extension portion of the cylindrical sliding member is configured to tightly contact a lower portion of the stopper by a compressive force of the at least one satellite compressing spring, and a position of the cylindrical sliding member is maintained, and
   when the button body moves downward by an external force, the stopper is configured to pull away from the button body and move inside the at least one penetration portion of the cylindrical supporting member, and the cylindrical sliding member is configured to slidably move upward by a compressive force of the at least one satellite compressing spring.

9. The electronic device of claim 8, wherein an upper surface of the stopper comprises an inclined plane,
   wherein the motion in which the upward-moved cylindrical sliding member moves downward and the lower extension portion of the cylindrical sliding member tightly contacts the lower portion of the stopper comprises:
   pre-motion in which the stopper is configured to be pressed by the lower extension portion of the cylindrical sliding member through the inclined plane and is configured to move inside the at least one penetration portion of the cylindrical supporting member; and
   post-motion in which when the lower extension portion of the cylindrical sliding member departs from the inclined plane of the stopper, the stopper is configured to again protrude outside the at least one penetration portion of the cylindrical supporting member.

10. The electronic device of claim 1, wherein the opening and closing unit is configured to hinge-connect one side of the glass cover to the housing.

11. The electronic device of claim 1, further comprising a tight contactor including a pair of coupling elements installed on the housing and the glass cover, respectively and configured to face each other.

12. The electronic device of claim 11, wherein the tight contactor is configured to use at least one of a mechanical coupling type or a magnetic attraction type.

13. The electronic device of claim 1, wherein the glass cover comprises at least one penetration portion, and the housing comprises at least one protrusion portion corresponding to the at least one penetration portion,
   wherein when the glass cover is closed, the at least one protrusion portion is configured to penetrate the at least one penetration portion of the glass cover, and protrude from an outer surface of the glass cover.

14. The electronic device of claim 13, wherein the protrusion portion of the housing comprises a camera.

15. The electronic device of claim 1, further comprising at least one attachable and detachable component installed in the housing and configured to be exposed to the outside when the glass cover is opened.

16. The electronic device of claim 15, wherein the at least one attachable and detachable component comprises a memory card or a battery.

17. The electronic device of claim 1, wherein the glass cover comprises a curved surface in at least a portion thereof.

18. The electronic device of claim 1, wherein the glass cover comprises a glass layer and at least one laminated element disposed on an upper portion or a lower portion of the glass layer.

19. The electronic device of claim 18, wherein the at least one laminated element comprises at least one of a layer formed by printing, a layer formed by spray printing, or a layer formed by vapor deposition.

20. The electronic device of claim 18, wherein the at least one laminated element comprises at least one of an anti-fouling or anti-fingerprint layer (AF layer), an anti-reflection layer (AR layer), an easy clean coating layer, a glass dispersion preventing layer, or an anti-scratch layer.

* * * * *